United States Patent
Kitahara

(10) Patent No.: US 11,265,600 B2
(45) Date of Patent: Mar. 1, 2022

(54) RECEPTION APPARATUS, RECEPTION METHOD, TRANSMISSION APPARATUS, AND TRANSMISSION METHOD FOR FLEXIBLE SIMULCAST OPERATION

(71) Applicant: Saturn Licensing LLC, New York, NY (US)

(72) Inventor: Jun Kitahara, Shizuoka (JP)

(73) Assignee: Saturn Licensing LLC, New York, NY (US)

( * ) Notice: Subject to any disclaimer, the term of this patent is extended or adjusted under 35 U.S.C. 154(b) by 7 days.

(21) Appl. No.: 16/610,017

(22) PCT Filed: May 2, 2018

(86) PCT No.: PCT/JP2018/017494
§ 371 (c)(1),
(2) Date: Oct. 31, 2019

(87) PCT Pub. No.: WO2018/211989
PCT Pub. Date: Nov. 22, 2018

(65) Prior Publication Data
US 2020/0077143 A1    Mar. 5, 2020

(30) Foreign Application Priority Data
May 17, 2017 (JP) .............................. JP2017-098085

(51) Int. Cl.
*H04N 21/4402* (2011.01)
*H04N 21/2343* (2011.01)
*H04N 21/2362* (2011.01)
*H04N 21/434* (2011.01)
*H04N 21/643* (2011.01)
(Continued)

(52) U.S. Cl.
CPC ... *H04N 21/44029* (2013.01); *H04N 21/2362* (2013.01); *H04N 21/23439* (2013.01);
(Continued)

(58) Field of Classification Search
CPC ....... H04N 21/44029; H04N 21/23439; H04N 21/2362; H04N 21/4345; H04N 21/643;
(Continued)

(56) References Cited

U.S. PATENT DOCUMENTS

2010/0186048 A1    7/2010  Waller
2013/0081088 A1    3/2013  Hwang et al.
(Continued)

FOREIGN PATENT DOCUMENTS

CA    2 967 245 A1    6/2016
EP    2 211 540 A     7/2010
(Continued)

OTHER PUBLICATIONS

International Search Report dated Aug. 6, 2018 in PCT/JP2018/017494, citing documents AA-AD, AO and AP therein, 3 pages.

*Primary Examiner* — James R Marandi
(74) *Attorney, Agent, or Firm* — Oblon, McClelland, Maier & Neustadt, L.L.P.

(57) ABSTRACT

There is provided a reception apparatus including receiver circuitry and processing circuitry. The receiver circuitry is configured to receive a first stream that includes a first broadcast service, time information, and channel information. The first broadcast service provides a first program that is a simulcast of a second program provided by a second broadcast service. Further, the second broadcast service is included in a second stream. The processing circuitry is configured to decode for display one of the first broadcast service provided by the first stream or a second broadcast service provided by the second stream according to a time indicated by the time information included in the first stream.

18 Claims, 29 Drawing Sheets

(51) Int. Cl.
*H04N 21/84* (2011.01)
*H04N 21/845* (2011.01)

(52) U.S. Cl.
CPC ....... *H04N 21/4345* (2013.01); *H04N 21/643* (2013.01); *H04N 21/84* (2013.01); *H04N 21/8456* (2013.01)

(58) Field of Classification Search
CPC .. H04N 21/84; H04N 21/8456; H04N 21/238; H04H 60/40; H04H 20/22
See application file for complete search history.

(56) References Cited

U.S. PATENT DOCUMENTS

| | | | |
|---|---|---|---|
| 2014/0059180 A1* | 2/2014 | Giladi | H04L 65/602 709/219 |
| 2014/0130114 A1 | 5/2014 | Hwang et al. | |
| 2015/0215662 A1* | 7/2015 | Shin | H04N 21/2383 725/116 |
| 2017/0034588 A1* | 2/2017 | Oh | H04N 21/8456 |
| 2017/0055025 A1* | 2/2017 | Lee | H04L 67/02 |
| 2017/0325000 A1 | 11/2017 | Kitazato et al. | |

FOREIGN PATENT DOCUMENTS

| | | |
|---|---|---|
| JP | 2015-192401 A | 11/2015 |
| JP | 2016-100845 A | 5/2016 |
| JP | 2016-146574 A | 8/2016 |
| JP | 2017-11503 A | 1/2017 |
| WO | WO 2013/005406 A1 | 1/2013 |
| WO | WO 2013/021600 A1 | 2/2013 |

* cited by examiner

| Element | | | Example | Description |
|---|---|---|---|---|
| EventStream | | | | |
| | @schemeIdUri | | urn:atsc3:us:simulcast Notification | Uri for notification about simulcast |
| | Event | | | |
| | | simulcastChannel | 25.1 | Channel number of simulcast base program (2K program) |
| | | simulcastEndTime | 2017-04-01T11:59:59 | End time of simulcast base program (4K program) |
| | | simulcastNextStartTime | 2017-04-01T13:00:00 | Restart time of simulcast base program (4K program) |

FIG.15

```
aligned(8) class DASHEventMessageBox extends FullBox('emsg', version=0, flags=0) {
    string          scheme_id_uri;
    string          value;
    unsigned int(32) timescale;
    unsigned int(32) presentation_time_delta;
    unsigned int(32) event_duration;
    unsigned int(32) id;
    unsigned int(8)  message_data[];
}
```

FIG.16

```
box_type='emsg'
scheme_id_uri = "urn:atsc3:us:simulcastNotification"
value = 0
timescale = 1000
presentation_time_delta = 0
event_duration = 0xFFFF
id = 1
message_data[] =
  simulcastChannel, "25.1" ;
  simulcastEndTime, "2017-04-01T11:59:59" ;
  simulcastNextStartTime, "2017-04-01T13:00:00" ;
```

| Element | | Example | Description |
|---|---|---|---|
| SimulcastEventDescriptor | | | |
| | simulcastChannel | 25.1 | Channel number of simulcast base program (2K program) |
| | simulcastEndTime | 2017-04-01T11:59:59 | End time of simulcast base program (4K program) |
| | simulcastNextStartTime | 2017-04-01T13:00:00 | Restart time of simulcast base program (4K program) |

```
--> {
    "jsonrpc": "2.0",
    "method" : org.atsc.query.simulcastService",
    "id": 45
}
```

FIG.20

```
--> {
    "jsonrpc": "2.0",
    "result": {
        "prefferedsimulcastMode": "sameBroadcaster",
        "currentChannel": "10.1",
        "simulcastChannel": "25.1",
        "simulcastEndTime": "2017-04-01T11:59:59",
        "simulcastNextStartTime": "2017-04-01T13:00:00"
    },
    "id": 45
}
```

FIG.21

Syntax

- prefferedsimulcastMode
  - SameBroadcaster: Same-broadcaster continuous view mode
  - SameChannel: New-broadcast service prefered view mode
- currentChannel
- Currently selected program channel number
- simulcastChannel
- Channel number for simulcast of currently viewed program (channel selection of program of existing broadcast service)
- simulcastEndTime
- End time of currently viewed program of broadcaster of new broadcast service
- simulcastNextStartTime"
- Restart time of currently viewed program of new broadcast service by broadcaster of new broadcast service

RECEPTION APPARATUS, RECEPTION METHOD, TRANSMISSION APPARATUS, AND TRANSMISSION METHOD FOR FLEXIBLE SIMULCAST OPERATION

TECHNICAL FIELD

The present technology relates to a reception apparatus, a reception method, a transmission apparatus, and a transmission method, and more particularly to a reception apparatus, a reception method, a transmission apparatus, and a transmission method in which simulcast operation can be more flexibly performed.

CROSS REFERENCE TO RELATED APPLICATIONS

This application claims the benefit of Japanese Priority Patent Application JP 2017-098085 filed May 17, 2017, the entire contents of which are incorporated herein by reference.

BACKGROUND ART

For example, establishment of standards of next-generation digital TV broadcasting such as advanced television systems committee (ATSC) 3.0 is in progress (e.g., see Patent Literature 1).

CITATION LIST

Patent Literature

PTL 1: Japanese Patent Application Laid-open No. 2017-011503

SUMMARY OF INVENTION

Technical Problem

By the way, for offering a new broadcast service such as next-generation digital TV broadcasting, it is conceivable to perform simulcast operation with a current, existing broadcast service. Thus, it is desirable to more flexibly perform simulcast operation.

The present technology has been made in view of the above-mentioned circumstances to be capable of more flexibly performing simulcast operation.

Solution to Problem

A reception apparatus according to a first aspect of the present technology is a reception apparatus including receiver circuitry and processing circuitry. The receiver circuitry is configured to receive a first stream that includes a first broadcast service, time information, and channel information. The first broadcast service provides a first program that is a simulcast of a second program provided by a second broadcast service. Further, the second broadcast service is included in a second stream. The processing circuitry is configured to decode for display one of the first broadcast service provided by the first stream or a second broadcast service provided by the second stream according to a time indicated by the time information included in the first stream.

The reception apparatus according to the first aspect of the present technology may be an independent apparatus or may be internal blocks constituting a single apparatus. Further, a reception method according to the first aspect of the present technology is a reception method corresponding to the reception apparatus according to the first aspect of the present technology. For example, in the reception method of the reception apparatus, a first stream is received that includes a first broadcast service, time information, and channel information. The first broadcast service provides a first program that is a simulcast of a second program provided by a second broadcast service. The second broadcast service is included in a second stream. Further, one of the first broadcast service provided by the first stream or the second broadcast service provided by the second stream is decoded for display, by processing circuitry of the reception apparatus, according to a time indicated by the time information included in the first stream.

In the reception apparatus and the reception method according to the first aspect of the present technology, a first stream transmitted as a first broadcast service or a second stream transmitted as a second broadcast service that is a simulcast of the first broadcast service is received. On the basis of time information and channel information obtained from the first stream, reproduction of a program provided by the first stream is continued or switching to reproduction of a program provided by the second stream and indicated by the channel information is performed, at a point of time indicated by the time information.

A transmission apparatus according to a second aspect of the present technology is a transmission apparatus including processing circuitry and transmission circuitry. The processing circuitry is configured to generate simulcast information. The transmission circuitry is configured to transmit the simulcast information in a first stream that includes a first broadcast service. The first broadcast service provides a first program that is a simulcast of a second program provided by a second broadcast service. Further, the second broadcast service is included in a second stream. The simulcast information includes time information including an end time of the first program provided by the first broadcast service, and channel information including a channel number of the second program provided by the second broadcast service.

The transmission apparatus according to the second aspect of the present technology may be an independent apparatus or may be internal blocks constituting a single apparatus. Further, a transmission method according to the second aspect of the present technology is a transmission method corresponding to the transmission apparatus according to the second aspect of the present technology. For example, in the transmission method of the transmission apparatus, simulcast information is generated by processing circuitry of the transmission apparatus. The simulcast information is transmitted in a first stream that includes a first broadcast service. The first broadcast service provides a first program that is a simulcast of a second program provided by a second broadcast service. Further, the second broadcast service is included in a second stream. The simulcast information includes time information including an end time of the first program provided by the first broadcast service, and channel information including a channel number of the second program provided by the second broadcast service.

In the transmission apparatus and the transmission method according to the second aspect of the present technology, simulcast information for providing a second broadcast service as a simulcast of a first broadcast service is generated, and the simulcast information is transmitted together with a first stream transmitted as the first broadcast service and a second stream transmitted as the second broadcast service. Further, the simulcast information can include time information including an end time of a first program provided by the first stream, and channel information including a channel number of a second program provided by the second stream.

Advantageous Effects of Invention

In accordance with the first and second aspects of the present technology, it is possible to more flexibly perform simulcast operation.

It should be noted that the effects described here are not necessarily limitative and any effect described in the present disclosure may be provided.

BRIEF DESCRIPTION OF DRAWINGS

FIG. 15 is a diagram showing an example of an EventStream element of MPD.

FIG. 16 is a diagram showing an example of an Event Message Box defined by MPEG DASH.

FIG. 17 is a diagram showing a description example of DASHEventMessageBox of FIG. 16.

FIG. 18 is a diagram showing an example of SimulcastEventDescriptor.

FIG. 20 is a diagram showing an example of a query from the broadcast application to the receiver application.

FIG. 21 is a diagram showing an example of a response from the receiver application to the broadcast application.

FIG. 22 is a diagram showing an example of syntax of a result of the response of FIG. 21.

DESCRIPTION OF EMBODIMENTS

Hereinafter, an embodiment of the present technology will be described with reference to the drawings. Note that descriptions will be made in the following order.

1. Configuration of System
2. Outline of Present Technology
3. Detailed Contents of Present Technology
  (1) Same Broadcaster Continuous View Mode
  (2) New-Broadcast Service Preferred View Mode
4. Transmission Scheme of Simulcast Information
  (1) MPD-EventStream Scheme
  (2) In-Band Message Scheme
  (3) SimulcastEventDescriptor Scheme
5. Communication of Application
6. Flow of Processing on Transmission Side and Reception Side
7. Modified Examples
8. CONFIGURATION OF COMPUTER 1. Configuration of System (Configuration Example of Broadcasting System)

Figure 1:
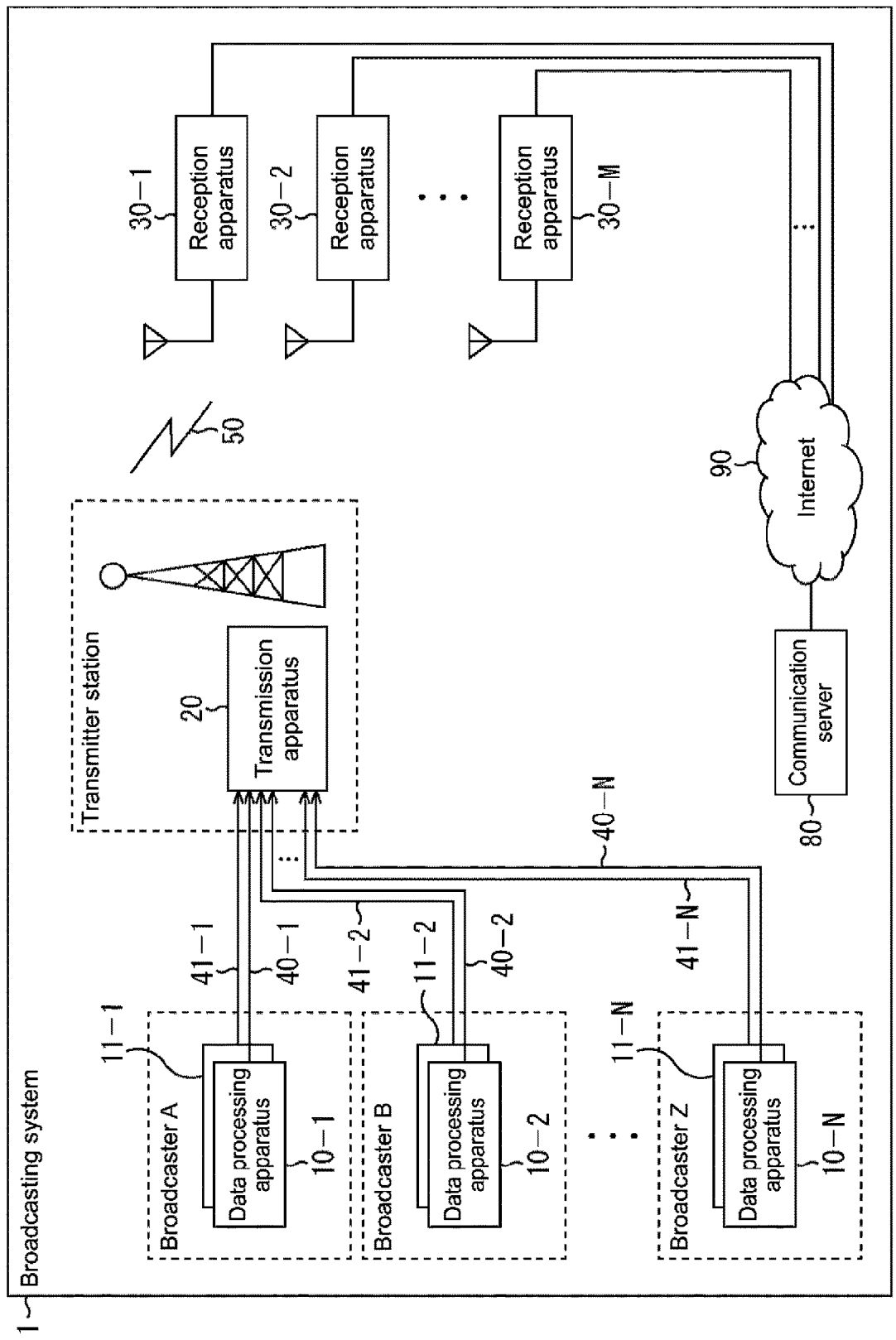
FIG. 1 is a block diagram showing a configuration of an embodiment of a broadcasting system to which the present technology is applied.

FIG. 1 is a block diagram showing a configuration of an embodiment of a broadcasting system to which the present technology is applied. Note that the system refers to a logical collection of a plurality of apparatuses.

In FIG. 1, a broadcasting system 1 includes data processing apparatuses 10-1 to 10-N (N is one or more integers) and data processing apparatuses 11-1 to 11-N (N is one or more integers) placed in facilities related to each broadcaster, a transmission apparatus 20 placed in a transmitter station, and reception apparatuses 30-1 to 30-M (M is one or more integers) possessed by users (viewers).

Further, in this broadcasting system 1, the data processing apparatuses 10-1 to 10-N or the data processing apparatuses 11-1 to 11-N and the transmission apparatus 20 are connected via communication lines 40-1 to 40-N or communication lines 41-1 to 41-N. Note that the communication lines 40-1 to 40-N and the communication lines 41-1 to 41-N can be dedicated lines, for example.

The data processing apparatus 10-1 processes broadcast content such as a TV program produced by a broadcaster A, and transmits the thus obtained transmission data to the transmission apparatus 20 via the communication line 40-1. Further, the data processing apparatus 11-1 processes broadcast content such as a TV program produced by the broadcaster A, and transmits the thus obtained transmission data to the transmission apparatus 20 via the communication line 41-1.

It should be noted that the broadcast content processed by the data processing apparatus 10-1 is a program of a 4K video (hereinafter, also referred to as 4K program) of a new broadcast service (e.g., ATSC3.0) such as next-generation digital TV broadcasting, and the broadcast content processed by the data processing apparatus 11-1 is a program of a 2K video (hereinafter, also referred to as 2K program) of a current, existing broadcast service (e.g., ATSC1.0).

Further, the data processing apparatus 10-1 or the data processing apparatus 11-1 is capable of processing a broadcast application to be executed in conjunction with the broadcast content, including the processed broadcast application in the transmission data, and transmitting them to the transmission apparatus 20 via the communication line 40-1 or the communication line 41-1.

In the data processing apparatuses 10-2 to 10-N, broadcast content such as 4K programs produced by respective broadcasters such as a broadcaster B and a broadcaster Z and broadcast applications are processed and the thus obtained transmission data is transmitted to the transmission apparatus 20 via the communication lines 40-2 to 40-N, as in the data processing apparatus 10-1.

Further, in the data processing apparatuses 11-2 to 11-N, broadcast content such as 2K programs produced by the respective broadcasters such as the broadcaster B and the broadcaster Z and broadcast applications are processed, and the thus obtained transmission data is transmitted to the transmission apparatus 20 via the communication lines 41-2 to 41-N, as in the data processing apparatus 11-1.

The transmission apparatus 20 receives the transmission data transmitted from the data processing apparatuses 10-1 to 10-N on the broadcaster side via the communication lines 40-1 to 40-N. Further, the transmission apparatus 20 receives the transmission data transmitted from the data processing apparatuses 11-1 to 11-N on the broadcaster side via the communication lines 41-1 to 41-N.

The transmission apparatus 20 processes the transmission data from the data processing apparatuses 10-1 to 10-N or the data processing apparatuses 11-1 to 11-N, and transmits the thus obtained broadcasting signals through a transmission antenna placed in the transmitter station. Here, for example, simulcast (simultaneous broadcasting) of the new broadcast service and the existing broadcast service is performed, and the 4K program and the 2K program are broadcast in each broadcaster.

The broadcasting signals from the transmission apparatus 20 of the transmitter station side are transmitted to the reception apparatuses 30-1 to 30-M via a broadcasting transmission path 50.

The reception apparatuses 30-1 to 30-M are stationary receivers such as a TV set, a set top box (STB), a recorder, a game console, and network storage or mobile receivers such as a smartphone, a mobile phone, and a tablet computer. Alternatively, the reception apparatuses 30-1 to 30-M may be, for example, in-vehicle devices installed in a vehicle, such as an in-vehicle TV, or wearable computers such as a head mounted display (HMD).

The reception apparatuses 30-1 to 30-M are adaptive to both of the new broadcast service (e.g., ATSC3.0) and the existing broadcast service (e.g., ATSC1.0) or only the existing broadcast service (e.g., ATSC1.0).

The reception apparatus 30-1 receives and processes the broadcasting signals transmitted from the transmission apparatus 20 via the broadcasting transmission path 50, to thereby reproduce the broadcast content such as the 4K program of the new broadcast service and the 2K program of the existing broadcast service according to a viewer's channel-selection operation. Further, the reception apparatus 30-1 is capable of acquiring and executing the broadcast application.

Further, the reception apparatus 30-1 has a communication function, and is capable of accessing a communication server 80 via Internet 90 and reproducing communication content delivered from the communication server 80. Further, the reception apparatus 30-1 is also capable of acquiring a communication application from the communication server 80 via the Internet 90 and executing the acquired communication application.

In reception apparatuses 30-2 to 30-M, the broadcasting signals from the transmission apparatus 20 are processed and the broadcast content according to a viewer's channel-selection operation is reproduced, as in the reception apparatus 30-1. Further, in the reception apparatuses 30-2 to 30-M, the broadcast application is executed as in the reception apparatus 30-1. Further, in the reception apparatuses 30-2 to 30-M, the communication content from the communication server 80 can be reproduced and the communication application can be executed, as in the reception apparatus 30-1.

Here, the broadcast content is, for example, a TV program such as news, sports, drama, and a shopping channel. Further, the broadcast application is an application developed in markup language such as HyperText Markup Language 5 (HTML5) or in script language such as JavaScript (registered trademark). Note that the detailed contents of the broadcast application adaptive to ATSC3.0 have been disclosed in Non-Patent Literature 1 and Non-Patent Literature 2 below.

Non-Patent Literature 1: ATSC Candidate Standard ATSC 3.0 Interactive Content (A/344)

Non-Patent Literature 2: ATSC Candidate Standard Application Signaling (A/337)

Further, in the reception apparatus 30, a receiver application as a resident application is incorporated in advance, and processing and the like on a received stream are performed. In the following descriptions, it is assumed that the broadcast application and the receiver application are explicitly distinguished.

Note that, in the broadcasting system 1, the broadcasting transmission path 50 may be, for example, terrestrial broadcasting, satellite broadcasting utilizing broadcasting satellite (BS) or communication satellite (CS), or wire-broadcasting using a cable (Common Antenna TeleVision (CATV)).

Hereinafter, the data processing apparatuses 10-1 to 10-N on the broadcaster side will be referred to as data processing apparatuses 10 if it is not particularly necessary to distinguish them, and the data processing apparatuses 11-2 to 11-N will be referred to as data processing apparatuses 11 if it is not particularly necessary to distinguish them.

Further, the reception apparatuses 30-1 to 30-M will be referred to as reception apparatuses 30 if it is not particularly necessary to distinguish them. It should be noted that the reception apparatuses 30 are adaptive to both broadcast services of the new broadcast service and the existing broadcast service.

(Configuration of Apparatus on Transmission Side)

Figure 2:
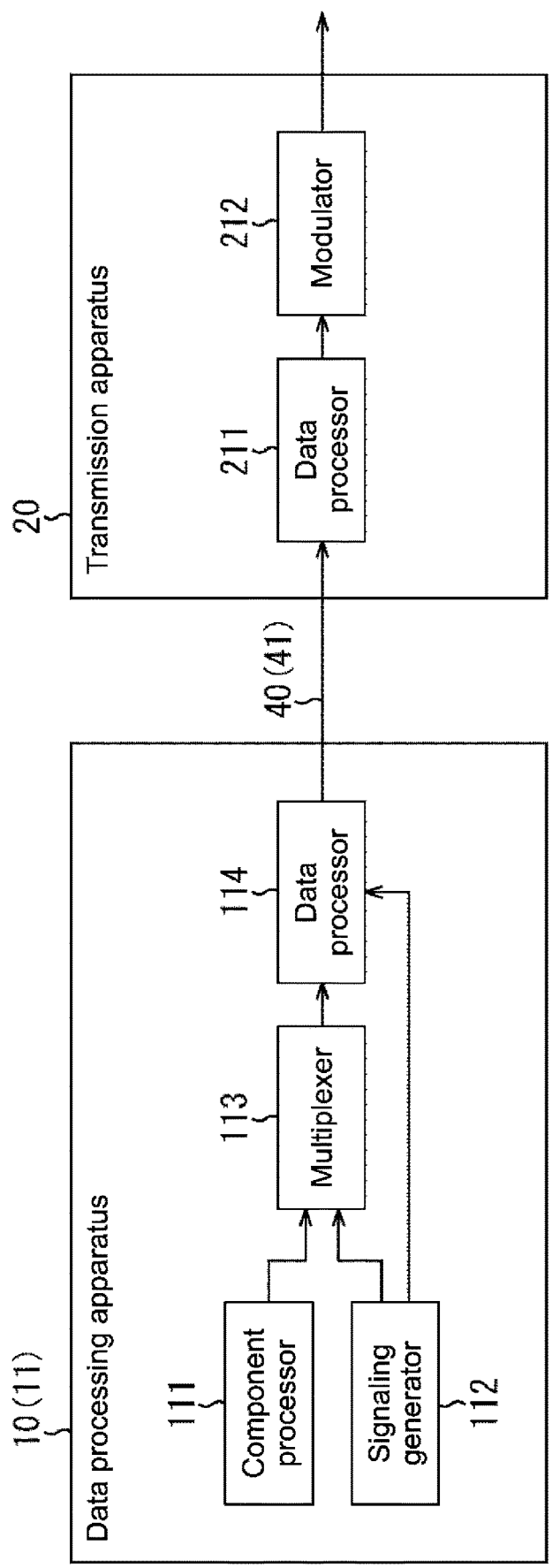
FIG. 2 is a block diagram showing a configuration example of a data processing apparatus and a transmission apparatus of FIG. 1.

FIG. 2 is a block diagram showing a configuration example of the data processing apparatus 10 or the data processing apparatus 11 and the transmission apparatus 20 of FIG. 1.

In FIG. 2, the data processing apparatus 10 includes a component processor 111, a signaling generator 112, a multiplexer 113, and a data processor 114.

The component processor 111 processes data of components forming the broadcast content such as the 4K program, and supplies a stream of the thus obtained components to the multiplexer 113. Here, the data of the components is, for example, data of video, audio, subtitle, and the like, and processing such as encoding according to a predetermined coding system is performed on that data, for example.

The signaling generator 112 generates signaling to be used in processing of an upper layer such as selection and reproduction of the broadcast content, and supplies the generated signaling to the multiplexer 113. Further, the signaling generator 112 generates signaling to be used in processing of a physical layer such as modulation and demodulation of broadcasting signals, and supplies the generated signaling to the data processor 114.

Note that the signaling will be also referred to as control information. Hereinafter, the signaling to be used in the processing of the physical layer will be referred to as physical-layer signaling (L1 signaling) and the signaling to be used in the processing of the upper layer that is a layer upper than the physical layer will be referred to as upper-layer signaling for distinguishing them.

The multiplexer 113 multiplexes a stream of the components supplied from the component processor 111 and a stream of the upper-layer signaling supplied from the signaling generator 112, and supplies the thus obtained stream to the data processor 114. Here, other streams including the broadcast application, time information, and the like may be multiplexed.

The data processor 114 processes the stream supplied from the multiplexer 113, and generates packets (frames) in a predetermined format. Further, the data processor 114 processes the packets in the predetermined format and the physical-layer signaling from the signaling generator 112, generates transmission data, and transmits the generated transmission data to the transmission apparatus 20 via the communication line 40.

Note that the data processing apparatus 11 is configured to be basically similar to the data processing apparatus 10, and hence a description thereof will be omitted. However, the data processing apparatus 11 is different from the data processing apparatus 10 in that the broadcast content is a 2K program or the like, and different coding systems for encoding and the like are used.

In FIG. 2, the transmission apparatus 20 includes a data processor 211 and a modulator 212.

The data processor 211 receives and processes the transmission data transmitted from the data processing apparatus 10 or the data processing apparatus 11 via the communication line 40, and extracts the thus obtained packets (frames) in the predetermined format and information about the physical-layer signaling.

The data processor 211 processes the packets (frames) in the predetermined format and the information about the physical-layer signaling to thereby generate a frame (physical-layer frame) of the physical layer according to a predetermined broadcast scheme, and supplies the generated frame (physical-layer frame) to the modulator 212.

At this time, a physical-layer frame adaptive to a new broadcast service (ATSC3.0) is generated from the transmission data from the data processing apparatus 10, and a physical-layer frame adaptive to an existing broadcast service (ATSC1.0) is generated from the transmission data from the data processing apparatus 11.

Although the physical-layer signaling is generated at the data processing apparatus 10 or the data processing apparatus 11 and transmitted to the transmission apparatus 20 in the configuration of FIG. 2, the physical-layer signaling may be generated at the transmission apparatus 20.

The modulator 212 performs necessary processing (e.g., modulation processing) on the physical-layer frame supplied from the data processor 211, and transmits the thus obtained broadcasting signals (RF signals) through the transmission antenna placed at the transmitter station.

The data processing apparatus 10 or the data processing apparatus 11 and the transmission apparatus 20 are configured in the above-mentioned manner.

(Functional Configuration of Apparatus on Transmission Side)

Figure 3:
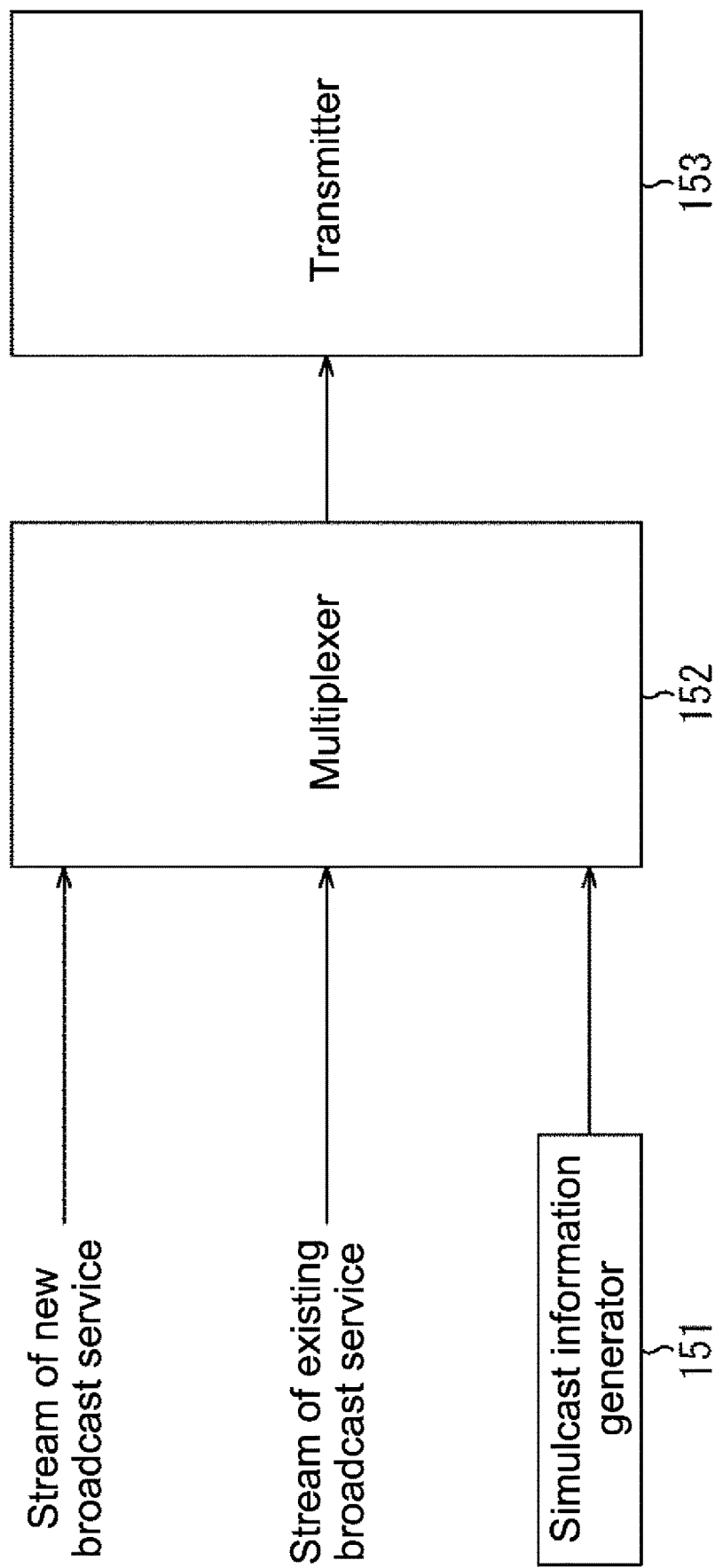
FIG. 3 is a block diagram showing a functional configuration example of the data processing apparatus and the transmission apparatus of FIG. 2.

FIG. 3 is a block diagram showing a functional configuration example the data processing apparatus 10 or the data processing apparatus 11 and the transmission apparatus 20 of FIG. 2.

A simulcast information generator 151 generates simulcast information, and supplies to the generated simulcast information to a multiplexer 152.

Here, the simulcast information is information for executing processing adaptive to simulcast of the new broadcast service and the existing broadcast service, and includes channel information and time information.

The channel information includes a channel number of a simulcast program. Further, the time information includes a program end time indicating an end time of a simulcast base program and a program restart time indicating a restart time of the simulcast base program.

The multiplexer 152 processes the stream of the new broadcast service, the stream of the existing broadcast service, and the simulcast information from the simulcast information generator 151, which are input therein. Then, the multiplexer 152 includes the simulcast information in the stream of the new broadcast service or the stream of the existing broadcast service. Note that a transmission scheme of the simulcast information will be described later with reference to FIGS. 15 to 18.

The stream processed by the multiplexer 152 is supplied to a transmitter 153. The transmitter 153 processes the stream from the multiplexer 152 and transmits the thus obtained broadcasting signals.

Hereinabove, the configuration of the apparatus on the transmission side has been described.

(Configuration of Apparatus on Reception Side)

Figure 4:
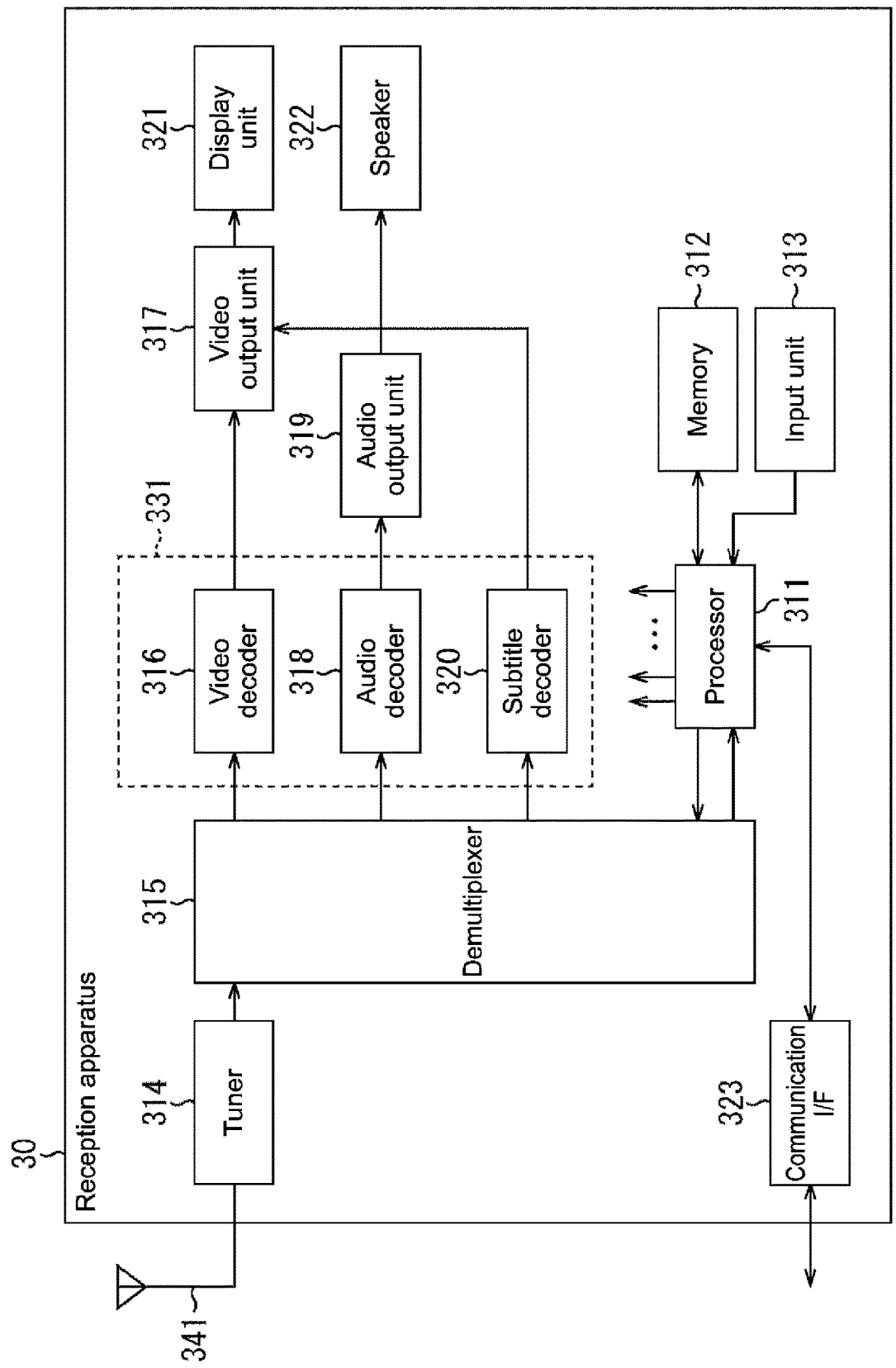
FIG. 4 is a block diagram showing a configuration example of a reception apparatus of FIG. 1.

FIG. 4 is a block diagram showing a configuration example of the reception apparatus 30 of FIG. 1.

In FIG. 4, the reception apparatus 30 includes a processor 311, a memory 312, an input unit 313, a tuner 314, a demultiplexer 315, a video decoder 316, a video output unit 317, an audio decoder 318, an audio output unit 319, a subtitle decoder 320, a display unit 321, a speaker 322, and a communication I/F 323.

The processor 311 includes, for example, a central processing unit (CPU) and a microprocessor. The processor 311 operates as a central control apparatus in the reception apparatus 30 and performs various types of arithmetic processing, and operation control of the respective units, and the like.

The memory 312 is, for example, a nonvolatile memory such as a non-volatile RAM (NVRAM). The memory 312 records various types of data under the control of the processor 311.

The input unit 313 supplies operation signals according to a viewer's operation to the processor 311. The processor 311 controls operations of the respective units on the basis of the operation signals supplied from the input unit 313.

The tuner 314 extracts, from broadcasting signals (RF signals) received via an antenna 341, signals according to a channel-selection operation of the broadcast service and demodulates the extracted signals, and supplies the thus obtained stream to the demultiplexer 315.

The demultiplexer 315 separates the stream supplied from the tuner 314 into the stream of the components such as audio, video, and subtitle and the signaling. The demultiplexer 315 supplies the video data to the video decoder 316, the audio data to the audio decoder 318, the subtitle data to the subtitle decoder 320, and the signaling to the processor 311.

On the basis of the signaling supplied from the demultiplexer 315, the processor 311 controls operations of the respective units to reproduce the broadcast content.

The video decoder 316 performs processing such as decoding according to a predetermined decoding scheme, for example, on the video data supplied from the demultiplexer 315, and supplies the processed video data to the video output unit 317. The video output unit 317 displays the video according to the video data supplied from the video decoder 316, on the display unit 321.

The audio decoder 318 performs processing such as decoding according to a predetermined decoding scheme, for example, on the audio data supplied from the demultiplexer 315, and supplies the processed audio data to the audio output unit 319. The audio output unit 319 outputs the audio according to the audio data supplied from the audio decoder 318, through the speaker 322.

The subtitle decoder 320 performs processing such as decoding according to a predetermined decoding scheme, for example, on the subtitle data supplied from the demultiplexer 315, and supplies the processed subtitle data to the video output unit 317. The video output unit 317 causes the subtitle corresponding to the subtitle data supplied from the subtitle decoder 320 to be displayed superimposed on the video corresponding to the video data supplied from the video decoder 316.

For example, when the channel-selection operation of the new broadcast service is made at the reception apparatus 30, the stream of the new broadcast service is processed and the 4K program is reproduced. Further, for example, when channel selection of the existing broadcast service is performed at the reception apparatus 30, the stream of the existing broadcast service is processed and the 2K program is reproduced. Note that different decoding schemes for decoding and the like are used for processing in reproduction of the 4K program and the 2K program.

The communication I/F 323 includes a communication interface circuit and the like. The communication I/F 323 exchanges various types of data with the communication server 80 via the Internet 90 under the control of the processor 311.

Although the configuration including the display unit 321 and the speaker 322 is shown in the reception apparatus 30 of FIG. 4, a configuration without the display unit 321 and the speaker 322 may be employed and the video data and the audio data may be output to an external display apparatus and a speaker apparatus. Hereinafter, the video decoder 316, the audio decoder 318, and the subtitle decoder 320 will be collectively referred to as a video/audio/subtitle decoder 331.

(Functional Configuration of Processor)

Figure 5:
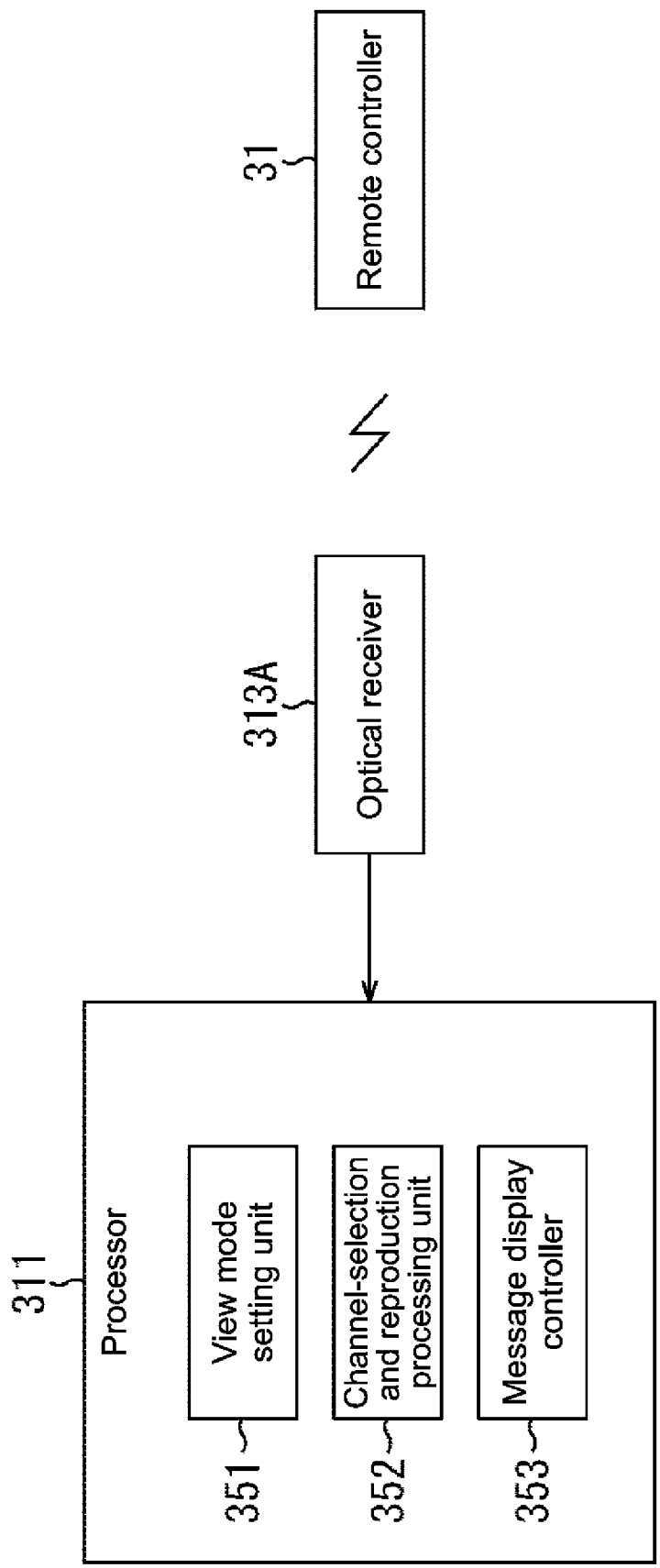
FIG. 5 is a block diagram showing a functional configuration example of a processor of FIG. 4.

FIG. 5 is a block diagram showing a functional configuration example of the processor 311 of FIG. 4.

When the viewer operates a remote controller 31, an optical receiver 313A receives a command according to that operation, and supplies the received command to the processor 311. The processor 311 controls operations of the respective units on the basis of the command supplied from the optical receiver 313A.

The processor 311 includes a view mode setting unit 351, a channel selection and reproduction processing unit 352, and a message display controller 353.

The view mode setting unit 351 sets a view mode in accordance with a viewer's instruction on a view mode setting screen displayed on the display unit 321. Note that, as will be described later in detail, the view mode includes two types of modes of a same-broadcaster continuous view mode and a new-broadcast service preferred view mode.

The channel selection and reproduction processing unit 352 processes the received stream of the new broadcast service or the received stream of the existing broadcast service, and reproduces the 4K program of the new broadcast service or the 2K program of the existing broadcast service.

Note that the channel selection and reproduction processing unit 352 corresponds to a function of the receiver application to be described later. That is, in the channel selection and reproduction processing unit 352, the processing on the stream of the new broadcast service is equivalent to a function of an ATSC3.0 receiver application (FIG. 19) to be described later, and the processing on the stream of the existing broadcast service is equivalent to a function of an ATSC1.0 receiver application (FIG. 19) to be described later.

The message display controller 353 performs control to display a predetermined message in a predetermined region of a screen of the display unit 321 on the basis of the simulcast information. Note that the message display controller 353 corresponds to a function of the broadcast application to be described later.

Hereinabove, the configuration of the apparatus on the reception side has been described.

2. OUTLINE OF PRESENT TECHNOLOGY

By the way, a broadcaster that wishes to start a new broadcast service has to ensure a frequency band for this new broadcast service. Here, it is conceivable to divert the frequency band of the existing broadcast service operated by this broadcaster as one of means for ensuring the frequency band.

However, there are regulations of an organization that performs regulatory oversight of broadcasting communication projects (e.g., Federal Communications Commission (FCC) in the United States or Ministry of Internal Affairs and Communications in Japan). In addition, it is desirable to continue the existing business. Therefore, it is very difficult to introduce operation which suddenly disables viewers to view the existing broadcast service.

In view of this, alternative means is that a plurality of broadcasters (e.g., two companies, broadcaster A and broadcaster B) that wish to start a new broadcast service cooperate with each other and one channel is allocated to the new broadcast service and another channel is allocated to the existing broadcast service.

Note that, if one broadcaster possesses a plurality of channels, this broadcaster may independently operate without cooperating with other broadcasters and these channels may be allocated to the new broadcast service and the existing broadcast service.

Hereinafter, a specific example will be described with reference to FIGS. 6 to 8. Here, a case where the broadcaster A possesses one channel (10.1 CH) and the broadcaster B possesses one channel (25.1 CH) and the broadcaster A and the broadcaster B cooperatively operates the two channels (10.1 CH and 25.1 CH) will be described as an example.

In actual operation, an operation company like a platform company can intermediate therebetween and operate the two channels. However, the existence of such an operation company is ignored herein.

On the other hand, it is assumed that, for operating the new broadcast service, the organization that performs regulatory oversight of broadcasting communication projects requests the broadcasters to operate simulcast (simultaneous broadcasting) with the existing broadcast services. Thus, in providing the new broadcast service, the broadcaster A and the broadcaster B also provide the existing broadcast services that are simulcasts of the new broadcast service.

For that simulcast, a typical operation is that the same programs are provided at the same point of time with quality varied. For example, in this operation, one of the same programs is delivered with high definition (HD) image quality or standard definition (SD) image quality in the existing broadcast service. The other is delivered with 4K image quality or as a video with image quality higher than the conventional SD image quality or using high dynamic range (HDR) in the new broadcast service. Alternatively, another example of the operation is that, at the same point of time, a sports program (with HD image quality or SD image quality or as video with image quality higher than the conventional SD image quality or using HDR) is delivered in the existing broadcast service and a news program (with 4K image quality) is delivered in the new broadcast service.

(Example of Simulcast Operation)

Figure 6:
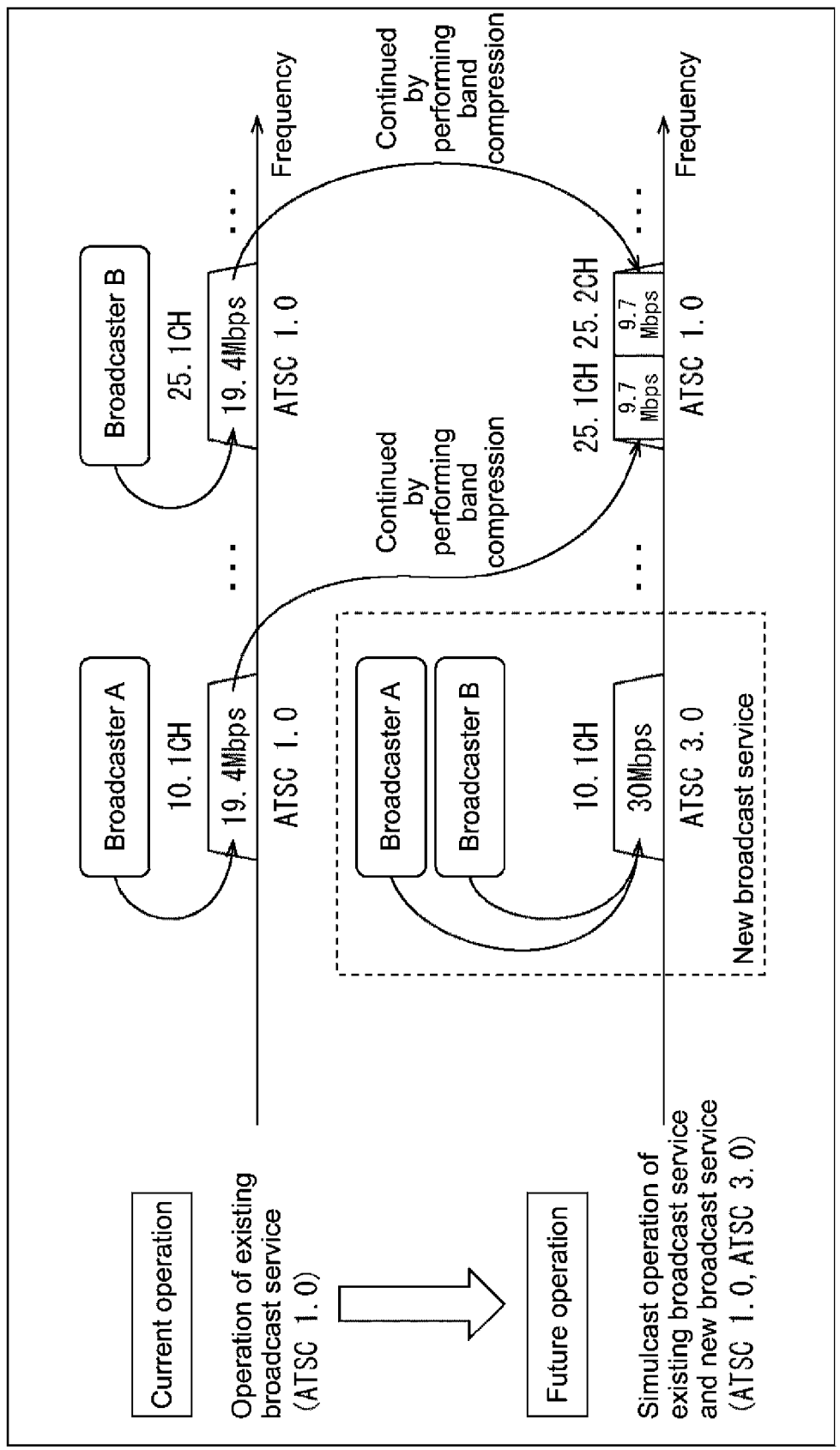
FIG. 6 is a diagram showing an example of simulcast operation of a new broadcast service and existing broadcast services.

FIG. 6 is a diagram showing an example of simulcast operation of a new broadcast service and existing broadcast services.

Note that, in this example, a case where ATSC3.0 is employed as the new broadcast service and ATSC1.0 is employed as the existing broadcast service will be described. Further, in FIG. 6, a frequency band allocated in operation of the existing broadcast service is shown in the upper part and a frequency band allocated in simulcast of the new broadcast service and the existing broadcast services is shown in the lower part.

In FIG. 6, the broadcaster A and the broadcaster B commonly use two channels of 10.1 CH and 25.1 CH.

In the current operation, only existing broadcast services (ATSC1.0) are operated. In these existing broadcast services, the broadcaster A utilizes a frequency band of 10.1 CH to provide the broadcast service and the broadcaster B utilizes a frequency band of 25.1 CH to provide the broadcast service.

On the other hand, in future operation, not only operation of the new broadcast service (ATSC3.0) but also operation of the existing broadcast services (ATSC1.0) are continuously performed. Therefore, the simulcast operation is performed by allocating one frequency band to the new broadcast service and other frequency bands to the existing broadcast services. In this example, the frequency band of 10.1 CH is allocated to the new broadcast service and the frequency band of 25.1 CH is allocated to the existing broadcast services.

Here, in the existing broadcast services, the frequency band (e.g., 6 MHz) of one physical channel has a transmission capacity of about 19.4 Mbps. This transmission capacity is a value depending on a technology defined by an existing broadcast service (ATSC1.0) standard. If two broadcast services are transmitted via one physical channel, the transmission capacity for each broadcast service is about 9.7 Mbps that is a half thereof.

That is, in the existing broadcast services, the broadcaster A and the broadcaster B each continue the broadcast service. Therefore, 25 CH is divided into two channels as 25.1 CH and 25.2 CH. By utilizing each of the frequency bands of 25.1 CH and 25.2 CH, the broadcast service is provided by each broadcaster.

Specifically, the frequency band of 25.1 CH is allocated to the existing broadcast service of the broadcaster A and the frequency band of 25.2 CH is allocated to the existing broadcast service of the broadcaster B. In this manner, the transmission capacity of each existing broadcast service drops from about 19.4 Mbps to about 9.7 Mbps. However, the broadcast service can be continued by performing band compression.

Further, if a service covering a region equivalent to that of the existing broadcast service is offered in the new broadcast service, the frequency band (e.g., 6 MHz) of one physical channel has a transmission capacity of about 30 Mbps. This is due to technological developments of the physical layer of broadcasting, which are achieved between the time of establishing the existing broadcast service (ATSC1.0) standard to the time of establishing the new broadcast service (ATSC3.0) standard. Note that the transmission capacity also changes by changing the strength to noise.

In this manner, the transmission capacity of the new broadcast service increases from about 19.4 Mbps to about 30 Mbps, 10 CH is allocated to the new broadcast service, and each of the broadcast services of the broadcaster A and the broadcaster B is provided by utilizing the frequency band of 10.1 CH.

Then, by allocating the frequency band of each physical channel to each of the new broadcast service and the existing broadcast services as shown in the lower part of FIG. 6, program scheduling of the new broadcast service and the existing broadcast services in the simulcast operation can be as follows.

(First Example of Program Scheduling)

Figure 7:
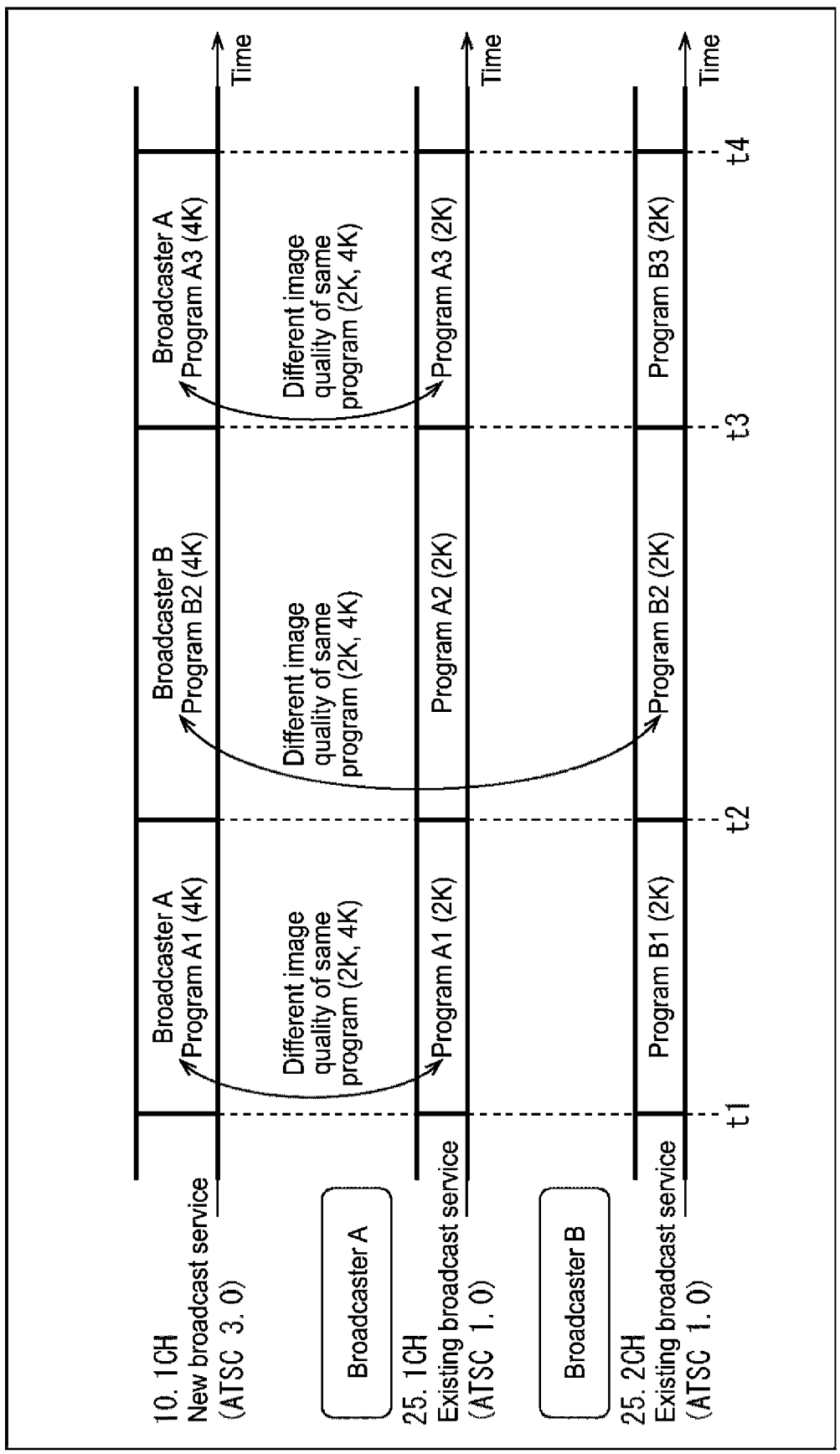
FIG. 7 is a diagram showing a first example of program scheduling of the new broadcast service and the existing broadcast services.

FIG. 7 is a diagram showing a first example of program scheduling of the new broadcast service and the existing broadcast services.

In the upper part of FIG. 7, programs provided by the new broadcast service utilizing the frequency band of 10.1 CH are chronologically shown. Further, in the middle part and the lower part of FIG. 7, a program provided by utilizing the frequency band of 25.1 CH and a program provided by utilizing the frequency band of 25.2 CH are chronologically shown as programs provided by the existing broadcast service, respectively.

The broadcaster A schedules programs to be broadcast between a point of time t1 to a point of time t4 such that a program A1 is broadcast between the point of time t1 to a point of time t2, a program A2 broadcast between the point of time t2 to a point of time t3, and the program A3 is broadcast between the point of time t3 to the point of time t4.

The broadcaster B schedules programs to be broadcast between the point of time t1 to the point of time t4 such that a program B1 is broadcast between the point of time t1 to the point of time t2, a program B2 is broadcast between the point of time t2 to the point of time t3, and a program B3 is broadcast between the point of time t3 to the point of time t4.

Here, the frequency band of 25.1 CH is utilized only in the existing broadcast service of the broadcaster A. Therefore, the program A1, the program A2, and the program A3 can be successively broadcast between the point of time t1 to the point of time t4. It should be noted that the program A1 to the program A3 provided by the existing broadcast service are 2K programs.

The frequency band of 25.2 CH is utilized only in the existing broadcast service of the broadcaster B. Therefore, the program B1, the program B2, and the program B3 can be successively broadcast between the point of time t1 to the point of time t4. It should be noted that the program B1 to the program B3 provided by the existing broadcast service are 2K programs.

Further, the frequency band of 10.1 CH is commonly used by the broadcaster A and the broadcaster B and utilized in the new broadcast service. Therefore, program scheduling is that the program A1 is broadcast between the point of time t1 to the point of time t2, the program B2 is broadcast between the point of time t2 to the point of time t3, and the program A3 is broadcast between the point of time t3 to the point of time t4. It should be noted that the program A1, the program B2, and the program A3 provided by the new broadcast service are 4K programs.

That is, it is assumed that, since 10.1 CH allocated to the new broadcast service is one physical channel, 10.1 CH handles programs to be broadcast by utilizing frequency bands of the physical channels of both of 25.1 CH and 25.2 CH in performing simulcast operation of the existing broadcast services. Thus, the 4K program corresponding to the 2K program broadcast in 25.1 CH and the 4K program corresponding to the 2K program broadcast in 25.2 CH are alternately broadcast.

Specifically, the program A1 (4K) broadcast in 10.1 CH and the program A1 (2K) broadcast in 25.1 CH between the point of time t1 to the point of time t2 are the same programs provided by the same broadcaster A and are also programs having different image quality (4K image quality and 2K image quality).

Further, the program B2 (4K) broadcast in 10.1 CH and the program B2 (2K) broadcast in 25.2 CH between the point of time t2 to the point of time t3 are the same programs provided by the same broadcaster B and also programs having different image quality. In addition, the program A3 (4K) broadcast in 10.1 CH and the program A3 (2K) broadcast in 25.1 CH between the point of time t3 to the point of time t4 are the same programs provided by the same broadcaster A and also programs having different image quality.

By performing simulcast operation of the new broadcast service and the existing broadcast services in accordance with such program scheduling, the existing broadcast service is continued even when the operation of the new broadcast service (ATSC3.0) having no backward compatibility with the current, existing broadcast service (ATSC1.0) is started. Therefore, it is possible to ensure that viewers can continuously view the broadcast services in the same manner as before.

Further, the 4K programs of the broadcasters commonly using the physical channel are alternately broadcast in the new broadcast service in the respective time zones. At the same time, the 2K programs of the respective broadcasters are continuously broadcast in the physical channels allocated to the respective broadcasters. Therefore, even when the new broadcast service is started, simulcast operation can be performed without reducing the number of services of the existing broadcast service and with the limited physical channel (frequency band).

Note that 10.1 CH is broadcast in accordance with the new broadcast service (ATSC3.0). Therefore, the reception apparatus 30 adapted to the ATSC3.0 standard is necessary for viewing the programs broadcast in 10.1 CH. Further, this reception apparatus 30 is also adapted to the ATSC1.0 standard, and can reproduce not only the programs provided by the new broadcast service (ATSC3.0), but also the programs provided by the existing broadcast services (ATSC1.0).

(Second Example of Program Scheduling)

Figure 8:
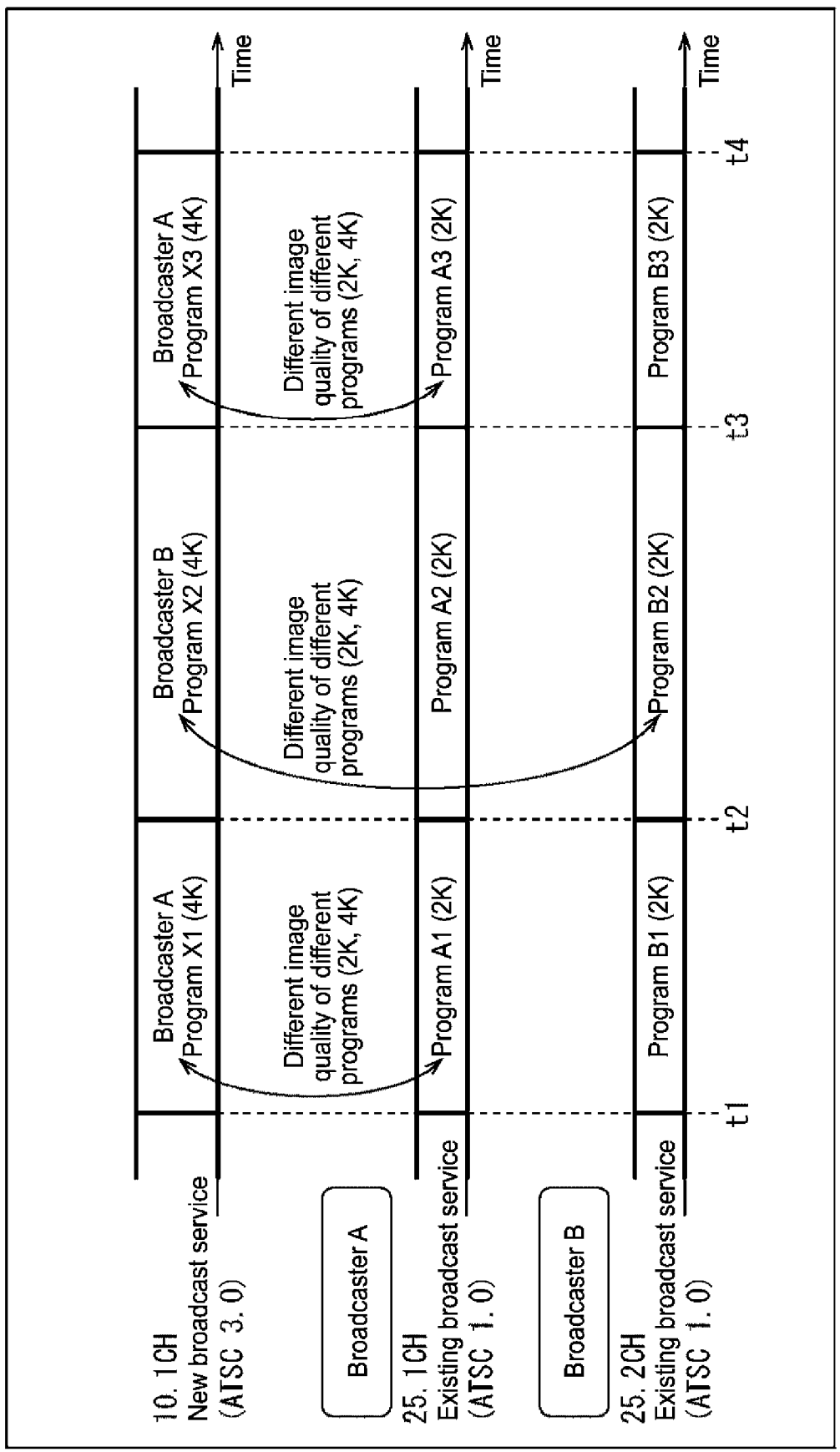
FIG. 8 is a diagram showing a second example of program scheduling of the new broadcast service and the existing broadcast services.

FIG. 8 is a diagram showing a second example of program scheduling of the new broadcast service and the existing broadcast services.

In performing simulcast operation of the new broadcast service and the existing broadcast services, programs broadcast in the same time zone are not limited to the same programs, and may be different programs.

In FIG. 8, 25.1 CH is utilized by the existing broadcast service of the broadcaster A as in FIG. 7. Program scheduling is that the program A1 (2K), the program A2 (2K), and the program A3 (2K) are successively broadcast between the point of time t1 to the point of time t4. Further, 25.2 CH is utilized by the existing broadcast service of the broadcaster B. Program scheduling is that the program B1 (2K), the program B2 (2K), and the program B3 (2K) are successively broadcast between the point of time t1 to the point of time t4.

The frequency band of 10.1 CH is commonly used by the broadcaster A and the broadcaster B and utilized in the new broadcast service. However, program scheduling is that a program X1 (4K) is broadcast between the point of time t1 to the point of time t2, a program X2 (4K) is broadcast between the point of time t2 to the point of time t3, and a program X3 (4K) is broadcast between the point of time t3 to the point of time t4.

That is, regarding the program X1 (4K) broadcast in 10.1 CH and the program A1 (2K) broadcast in 25.1 CH between the point of time t1 to the point of time t2, these programs are provided by the same broadcaster A. However, these programs are different programs and also programs having different image quality (4K image quality and 2K image quality).

Further, regarding the program X2 (4K) broadcast in 10.1 CH and the program B2 (2K) broadcast in 25.2 CH between the point of time t2 to the point of time t3, these programs are provided by the same broadcaster B. However, these programs are different programs and also programs having different image quality (4K image quality and 2K image quality).

Further, regarding the program X3 (4K) broadcast in 10.1 CH and the program A3 (2K) broadcast in 25.1 CH between the point of time t3 to the point of time t4, these programs are provided by the same broadcaster A. However, these programs are different programs and also programs having different image quality (4K image quality and 2K image quality).

By performing simulcast operation of the new broadcast service and the existing broadcast services in accordance with such program scheduling, the operation of the new broadcast service (ATSC3.0) is started to broadcast the program having higher image quality and the current, existing broadcast services (ATSC1.0) are continued. Therefore, it is possible to ensure that viewers can continuously view the broadcast services in the same manner as before and to provide a higher-level broadcast service.

Hereinafter, a case where the new broadcast service is ATSC3.0 and the existing broadcast services are ATSC1.0 will be described as an example by exemplifying the ATSC that is a broadcast scheme of terrestrial digital TV broadcasting employed in the United States and the like as in the above description. Further, in the description below, it is assumed that the program of the new broadcast service is a "4K program". That program may have middle resolution between the HD image quality and the SD image quality, not the 4K image quality, or may be a program having image quality enhanced by applying a high dynamic range (HDR) technique.

3. DETAILED CONTENTS OF PRESENT TECHNOLOGY

A case where the broadcaster A and the broadcaster B as described above each provide the existing broadcast service (ATSC1.0), the operation of the new broadcast service (ATSC3.0) is started, and simulcast operation is performed is assumed.

In this case, the broadcaster A and the broadcaster B commonly use one physical channel (frequency band of 6 MHz), such that the physical channel is allocated to two existing broadcast services (ATSC1.0) respectively provided by those broadcasters. Further, the broadcaster A and the broadcaster B commonly use the one physical channel (frequency band of 6 MHz), such that one physical channel is allocated to one new broadcast service (ATSC3.0) provided by those broadcasters.

Here, the organization that performs regulatory oversight of broadcasting communication projects or the like requests simulcast operation, and simulcast of the programs provided by the existing broadcasters or the like is performed. Since the one physical channel handles the two broadcasters (broadcaster A and broadcaster B), it is necessary to perform simulcast in a time-division manner, for example.

In this time-division simulcast, the 4K program of the broadcaster A and the 4K program of the broadcaster B are alternately broadcast in the new broadcast service utilizing the frequency band of 10.1 CH, as shown in the upper parts of FIGS. 7 and 8. Therefore, with some broadcasters, there is a stop time of the new broadcast service, and the programs are not constantly broadcast by simulcast.

For example, in FIGS. 7 and 8, for the broadcaster B, the 4K programs broadcast in 10.1 CH are the 4K programs of the broadcaster A and its own 4K programs are not broadcast between the point of time t1 to the point of time t2 and between the point of time t3 to the point of time t4. On the other hand, for the broadcaster A, the 4K program broadcast in 10.1 CH is the 4K program of the broadcaster B and its own 4K program is not broadcast between the point of time t2 to the point of time t3.

Here, in view of a viewer who is viewing the program, for example, when the viewer is viewing the program A1 (4K) broadcast in 10.1 CH and the program A1 (4K) ends at the point of time t2, the following two cases are conceivable.

First of all, one of the cases is a case where, for continuously viewing the programs provided by the broadcaster A, 25.1 CH (existing broadcast service) is selected at the point of time t2 and the program A2 (2K) broadcast in 25.1 CH is viewed. Secondly, the other is a case where, for the purpose of continuously viewing the 4K programs provided by the new broadcast service, 10.1 CH (new broadcast service) is continuously selected even after the point of time t2 and the program B2 (4K) broadcast in 10.1 CH is viewed.

A view mode depending on each of those cases is set in the reception apparatus 30. Accordingly, the viewer is allowed to view the programs according to the set view mode in the reception apparatus 30. Hereinafter, the former case will be referred to as the same-broadcaster continuous view mode and the latter case will be referred to as the new-broadcast service preferred view mode.

Then, the reception apparatus 30 operates on the same-broadcaster continuous view mode or the new-broadcast service preferred view mode on the basis of the simulcast information obtained from the received stream, to thereby enable the viewer to continuously view the 4K program and the 2K program of the same broadcaster or to continuously view the 4K programs of the new broadcast service.

Hereinafter, the same-broadcaster continuous view mode and the new-broadcast service preferred view mode will be described in the stated order.

(1) Same Broadcaster Continuous View Mode (Operation of Reception Apparatus)

Figure 9:
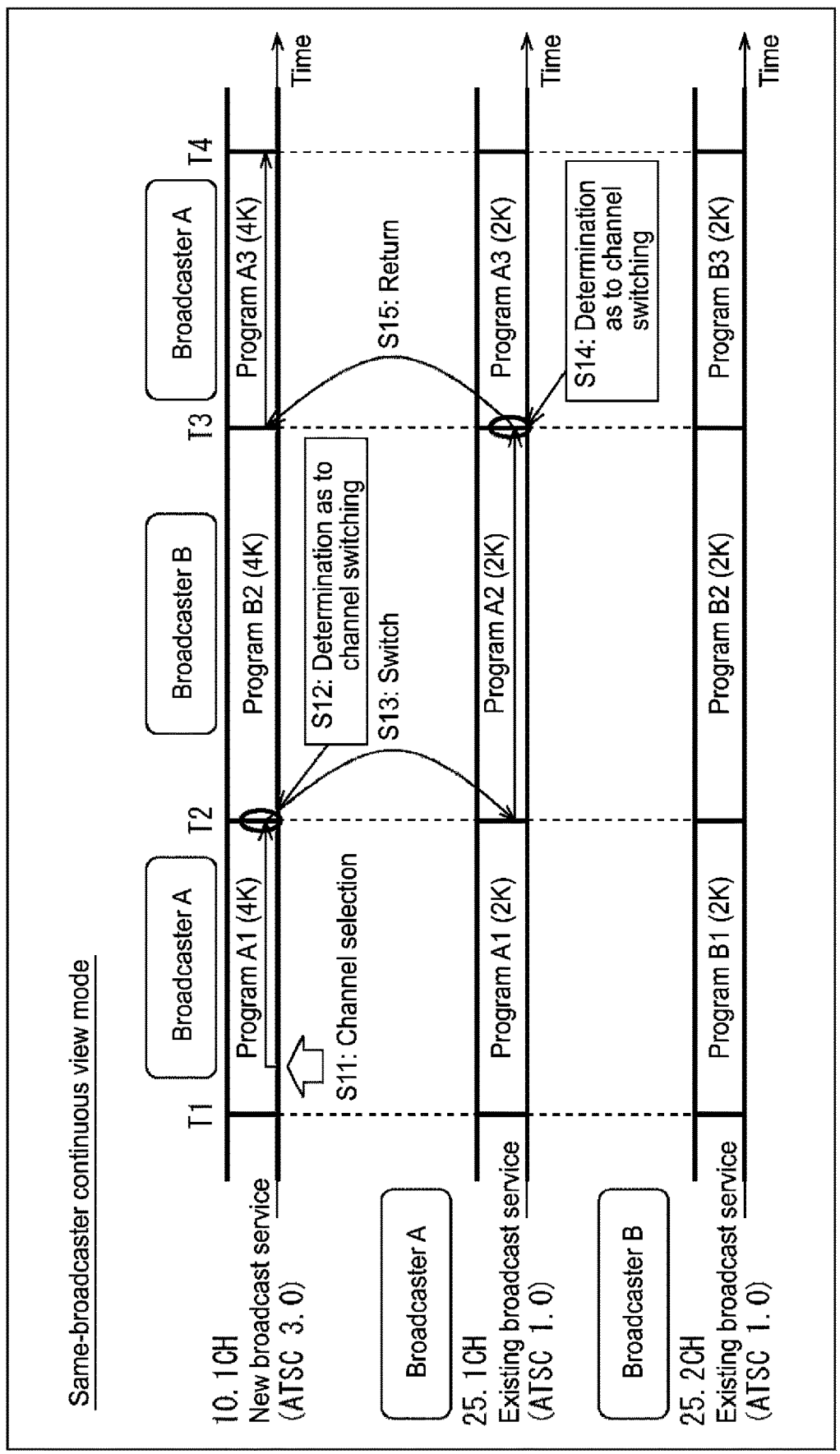
FIG. 9 is a diagram showing an example of an operation of the reception apparatus on a same-broadcaster continuous view mode.

FIG. 9 is a diagram showing an example of an operation of the reception apparatus 30 on the same-broadcaster continuous view mode. Note that, in FIG. 9, the same-broadcaster continuous view mode is set in the reception apparatus 30 as the view mode in advance.

In FIG. 9, in the reception apparatus 30, channel-selection processing is performed in accordance with a viewer's channel-selection operation (S11). In this channel-selection processing, the stream of the new broadcast service is received and processed in accordance with the channel-selection operation of 10.1 CH, and the program A1 (4K) is reproduced.

Then, the program A1 (4K) is broadcast in 10.1 CH between the point of time t1 to the point of time t2. Therefore, in the reception apparatus 30, the program A1 (4K) is continuously reproduced and the program A1 (4K) is viewed by the viewer.

At this time, in the reception apparatus 30, the broadcast application is acquired and activated via broadcasting. Further, in the reception apparatus 30, the receiver application retains the simulcast information obtained from the received stream and view mode information set in advance. Therefore, the broadcast application inquires from the receiver application about the simulcast information and the view mode information and acquires the simulcast information and the view mode information.

Note that communication between the broadcast application and the receiver application will be described later with reference to FIGS. 19 to 22. Further, the broadcast application is provided by the broadcaster A that broadcasts the program A1 (4K).

After that, at the point of time t2, the program A1 (4K) of 10.1 CH ends while determination processing of channel switching is performed in the reception apparatus 30 (S12).

Here, on the basis of end time information of the program A1 (4K) included in the simulcast information, the broadcast application is capable of presenting information indicating switching to the existing broadcast service (25.1 CH of broadcaster A), for example, at a point of time before the point of time t2, to thereby notify the viewer about switching to the existing broadcast service.

Figure 10:
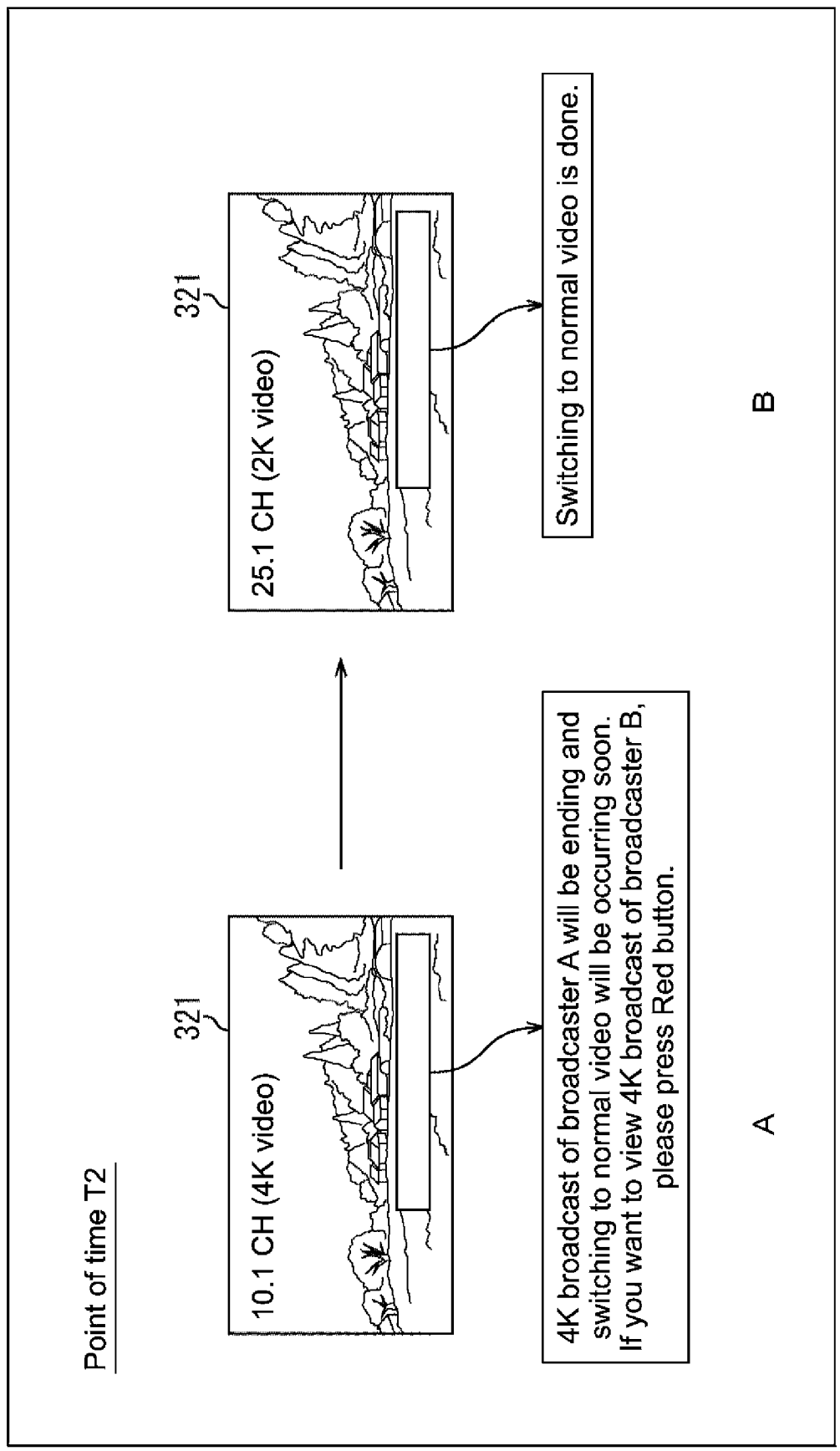
FIG. 10 is a diagram showing a first example of display of a message on the same-broadcaster continuous view mode.

Specifically, a message as shown in A of FIG. 10, for example, is displayed on the screen of the display unit 321 of the reception apparatus 30. That is, in A of FIG. 10, a message indicating that switching to the existing broadcast service is to be performed is displayed in a predetermined region such as a lower right region of the video having the 4K image quality of the program A1 in accordance with the broadcast application.

At this time, the broadcast application identifies that the same-broadcaster continuous view mode has been set as the view mode, on the basis of the view mode information. The message of A of FIG. 10 is displayed on the premise that the programs provided by the broadcaster A are to be continuously viewed.

Note that, if this message can include a message to press a Red button of the remote controller 31 for continuously viewing the new broadcast service (10.1 CH). Then, when the viewer who has checked this message operates the remote controller 31 and presses the Red button, the new broadcast service (10.1 CH) is continuously selected without switching the existing broadcast service (25.1 CH).

The case where the message is displayed as a text is illustrated in A of FIG. 10, though not limited to the text. Information as an image, an icon, or the like may be displayed. Further, irrespective of the display of the text or the image, notification indicating that switching to the existing broadcast service is to be performed may be performed by the use of other notification means such as sound. Regarding them, the same applies to other messages (e.g., messages in B of FIGS. 10 and 11 and FIGS. 13 and 14) to be described later.

In the determination processing (S12) of FIG. 9, if any operation is not performed by the viewer who has checked the message of A of FIG. 10, it is determined that the channel has to be switched to the existing broadcast service (25.1 CH of broadcaster A).

Then, in the reception apparatus 30, the broadcast application performs channel-selection processing on the basis of the channel information included in the simulcast information, such that the channel is switched from the new broadcast service (10.1 CH) to the existing broadcast service (25.1 CH of broadcaster A) (S13).

After that, when the channel switching is completed at a point of time after the point of time t2, the message as shown in B of FIG. 10 is displayed on the screen of the display unit 321 of the reception apparatus 30, for example. That is, in B of FIG. 10, a message indicating that switching to the existing broadcast service is done is displayed in the predetermined region such as the lower right region of the video having the 2K image quality of the program A2 in accordance with the broadcast application.

In the reception apparatus 30, the channel is thus switched from 10.1 CH to 25.1 CH at the point of time t2. In this manner, the programs (program A2 (4K) and program A2 (2K)) provided by the same broadcaster A can be continuously viewed by the viewer. At this time, the reception apparatus 30 operates on the same-broadcaster continuous view mode in accordance with the contents set in advance.

Then, the program A2 (2K) is broadcast in 25.1 CH between the point of time t2 to the point of time t3. Therefore, in the reception apparatus 30, the stream of the existing broadcast service is received and processed. In this manner, the program A2 (2K) is continuously reproduced and viewed by the viewer.

Note that, between the point of time t2 to the point of time t3, in the reception apparatus 30, the broadcast application is processed in the background and continuously executed, or a timer for activation just before the point of time (point of time t3) at which the program A3 (4K) restarts is set on the basis of program restart time information included in the simulcast information and halting is performed, for example, such that the broadcast application is held in a stand-by state until a time just before the point of time t3.

After that, at the point of time t3, the program A2 (2K) of 25.1 CH ends while determination processing of channel switching is performed in the reception apparatus 30 (S14).

Here, the broadcast application restoring from the standby state just before the point of time t3 presents information indicating that switching to the new broadcast service (10.1 CH) will be occurring at a point of time before the point of time t3, on the basis of restart time information of the program A3 (4K) included in the simulcast information, for example. In this manner, it is possible to notify the viewer about switching to the new broadcast service.

Figure 11:
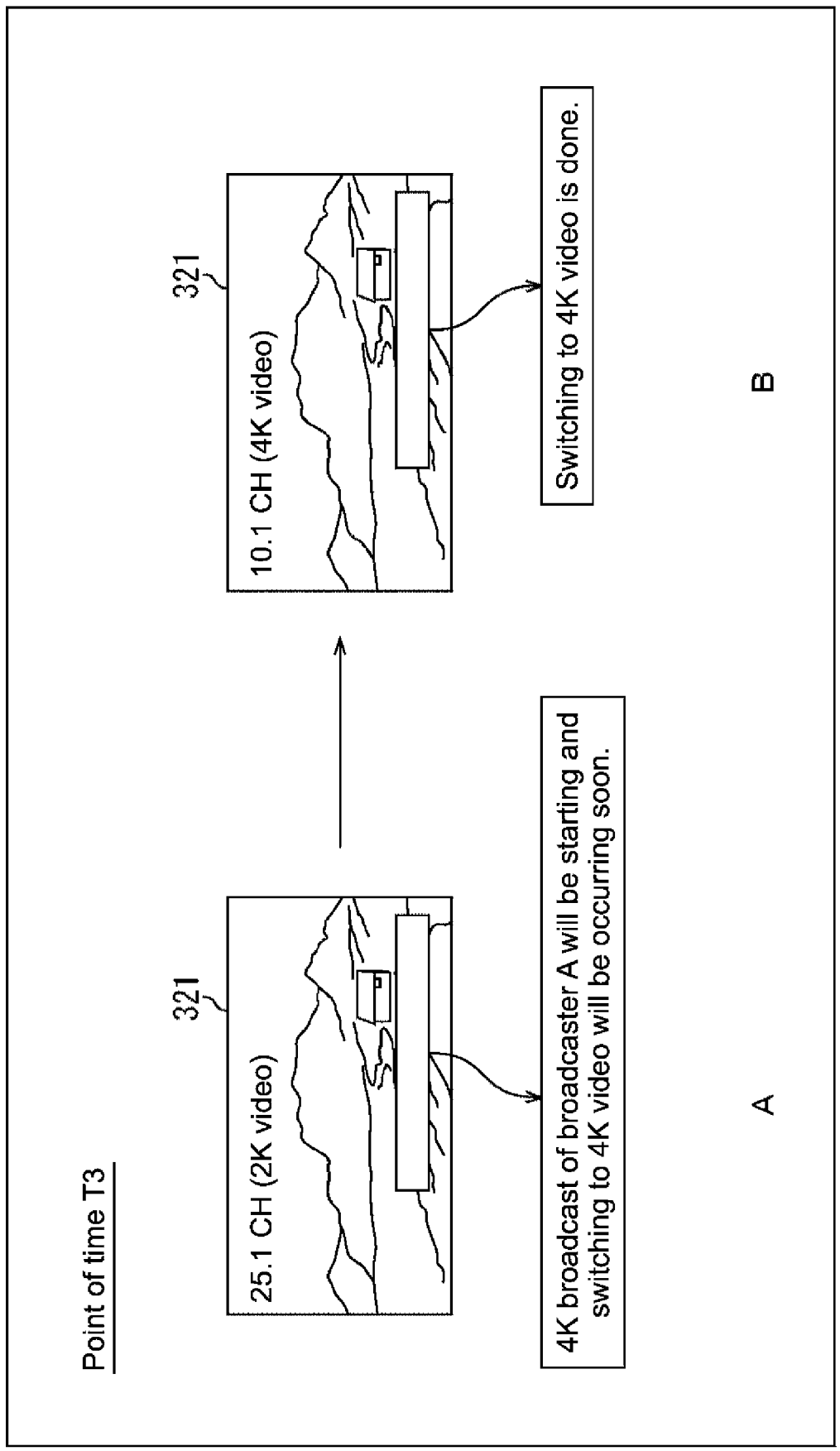
FIG. 11 is a diagram showing a second example of display of a message on the same-broadcaster continuous view mode.

Specifically, a message as shown in A of FIG. 11, for example, is displayed on the screen of the display unit 321 of the reception apparatus 30. That is, in A of FIG. 11, a message indicating that it switches to the new broadcast service is displayed by the broadcast application in the predetermined region of the video having the 2K image quality of the program A2.

At this time, in the reception apparatus 30, the same-broadcaster continuous view mode has been set as the view mode. Therefore, on the premise that the programs provided by the broadcaster A are to be continuously viewed, the message of A of FIG. 11 is displayed by the broadcast application.

In the determination processing (S14) of FIG. 9, if any operation is not performed by the viewer who has checked the message of A of FIG. 11, it is determined that the channel has to be switched to the new broadcast service (10.1 CH).

Then, in the reception apparatus 30, the broadcast application performs channel-selection processing on the basis of the already acquired channel information. In this manner, the channel is switched from the existing broadcast service (25.1 CH of broadcaster A) to the new broadcast service (10.1 CH) and returned to the original channel in the channel-selection (S15).

After that, when the channel switching is completed at a point of time after the point of time t3, a message as shown in B of FIG. 11, for example, is displayed on the screen of the display unit 321 of the reception apparatus 30. That is, in B of FIG. 11, a message indicating that switching to the new broadcast service has been completed is displayed by the broadcast application in the predetermined region such as the lower right region of the video having the 4K image quality of the program A3.

In the reception apparatus 30, by switching the channel from 25.1 CH to 10.1 CH at the point of time t3 in this manner, the programs (program A1 (4K), program A2 (2K), and program A3 (4K)), which are provided by the same broadcaster A, can be continuously viewed by the viewer. At this time, the reception apparatus 30 operates on the same-broadcaster continuous view mode in accordance with the contents set in advance.

Processing after the point of time t4 is similar to that described above, and hence a description thereof will be omitted. However, in 10.1 CH, during reproduction of the program A3 (4K), the simulcast information and the view mode information are acquired, and processing or the like based on the end time information of the program A3 (4K) is performed.

Note that, when the viewer who has checked the message of A of FIG. 10 presses the Red button of the remote controller 31, it is determined that it is unnecessary to perform channel switching to the existing broadcast service (25.1 CH of broadcaster A) in the determination processing (S12) of FIG. 9.

In this case, the channel switching processing (S13) of FIG. 9 is not performed, the reception of the stream of the new broadcast service (10.1 CH) is continued, and reproduction of the program B2 (4K) of the broadcaster B is started at the point of time t2. At this time, the view mode is updated, and the reception apparatus 30 operates on the new-broadcast service preferred view mode.

Although the messages of FIGS. 10 and 11 are displayed by the broadcast application in the above description, those messages may be displayed by the receiver application.

Although the case where the two broadcasters of the broadcaster A and the broadcaster B commonly use the one physical channel of the new broadcast service has been described above as the example, three or more broadcasters may commonly use the one physical channel of the new broadcast service.

(2) New-Broadcast Service Preferred View Mode (Operation of Reception Apparatus)

Figure 12:
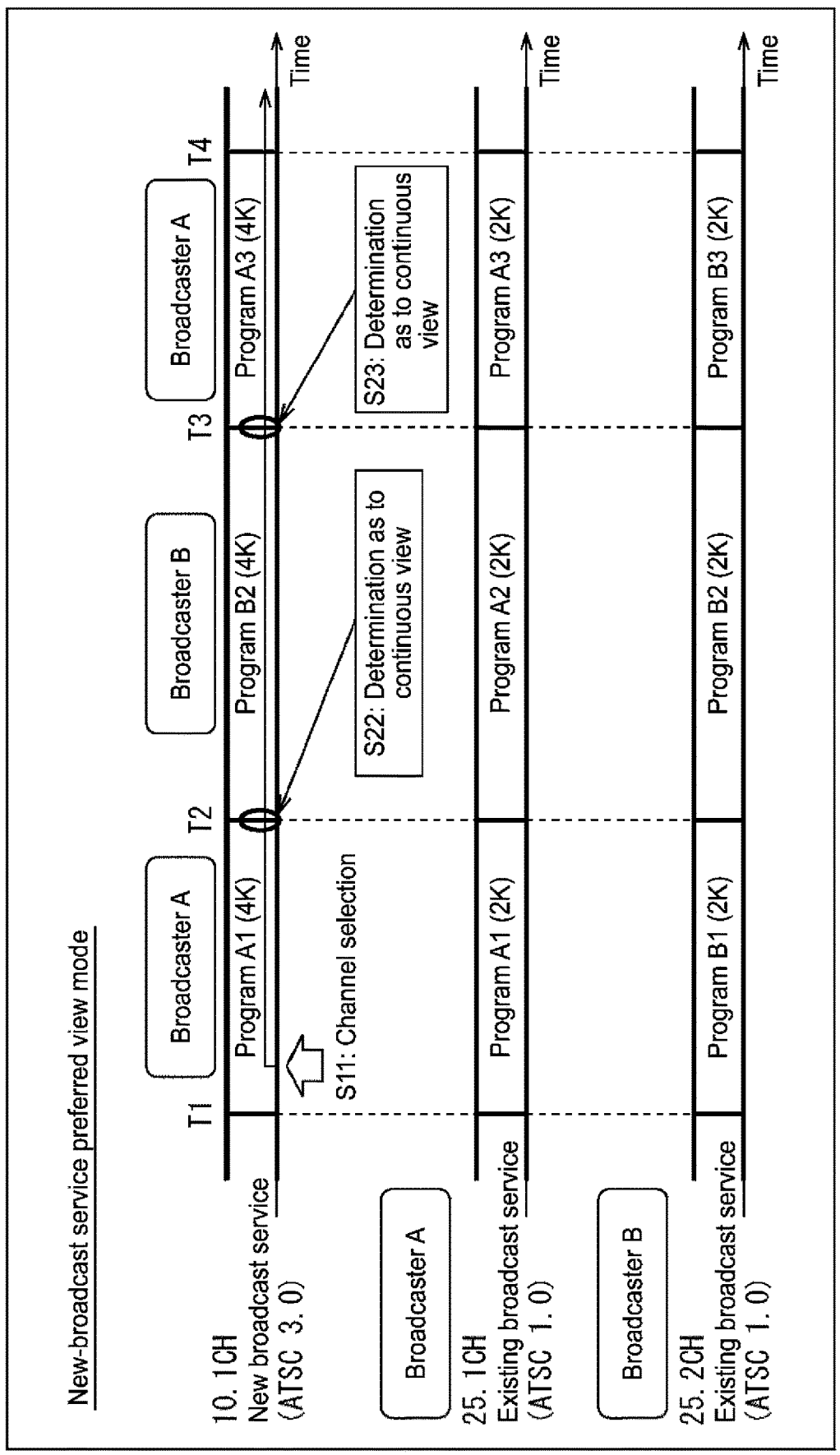
FIG. 12 is a diagram showing an example of an operation of the reception apparatus on a new-broadcast service preferred view mode.

FIG. 12 is a diagram showing an example of the operation of the reception apparatus 30 on the new-broadcast service preferred view mode. It is assumed that the new-broadcast service preferred view mode is set in advance as the view mode in the reception apparatus 30 in FIG. 12.

In FIG. 12, in the reception apparatus 30, channel-selection processing is performed in accordance with a viewer's channel-selection operation (S21). In this channel-selection processing, the stream of the new broadcast service is received and processed in accordance with the channel-selection operation of 10.1 CH, and the program A1 (4K) is reproduced.

Then, the program A1 (4K) is broadcast in 10.1 CH between the point of time t1 to the point of time t2. Therefore, in the reception apparatus 30, the program A2 (4K) is continuously reproduced and the program A1 (4K) is viewed by the viewer.

At this time, in the reception apparatus 30, the broadcast application is acquired and activated via broadcasting. Note that the broadcast application is provided by the broadcaster A that broadcasts the program A1 (4K).

Further, in the reception apparatus 30, the receiver application retains the simulcast information obtained from the received stream and the view mode information set in advance. Therefore, the broadcast application inquires from the receiver application about the simulcast information and the view mode information and acquires the simulcast information and the view mode information.

After that, at the point of time t2, the program A1 (4K) of 10.1 CH ends. Meanwhile, in the reception apparatus 30, the determination processing (S22) of continuous viewing is performed.

Here, the broadcast application continues the new broadcast service (10.1 CH) on the basis of the end time information of the program A1 (4K) included in the simulcast information, for example, at the point of time before the point of time t2, and presents information indicating that the broadcaster that provides the 4K program is switched. In this manner, it is possible to notify the viewer about switching of the broadcaster that provides the 4K program.

Figure 13:
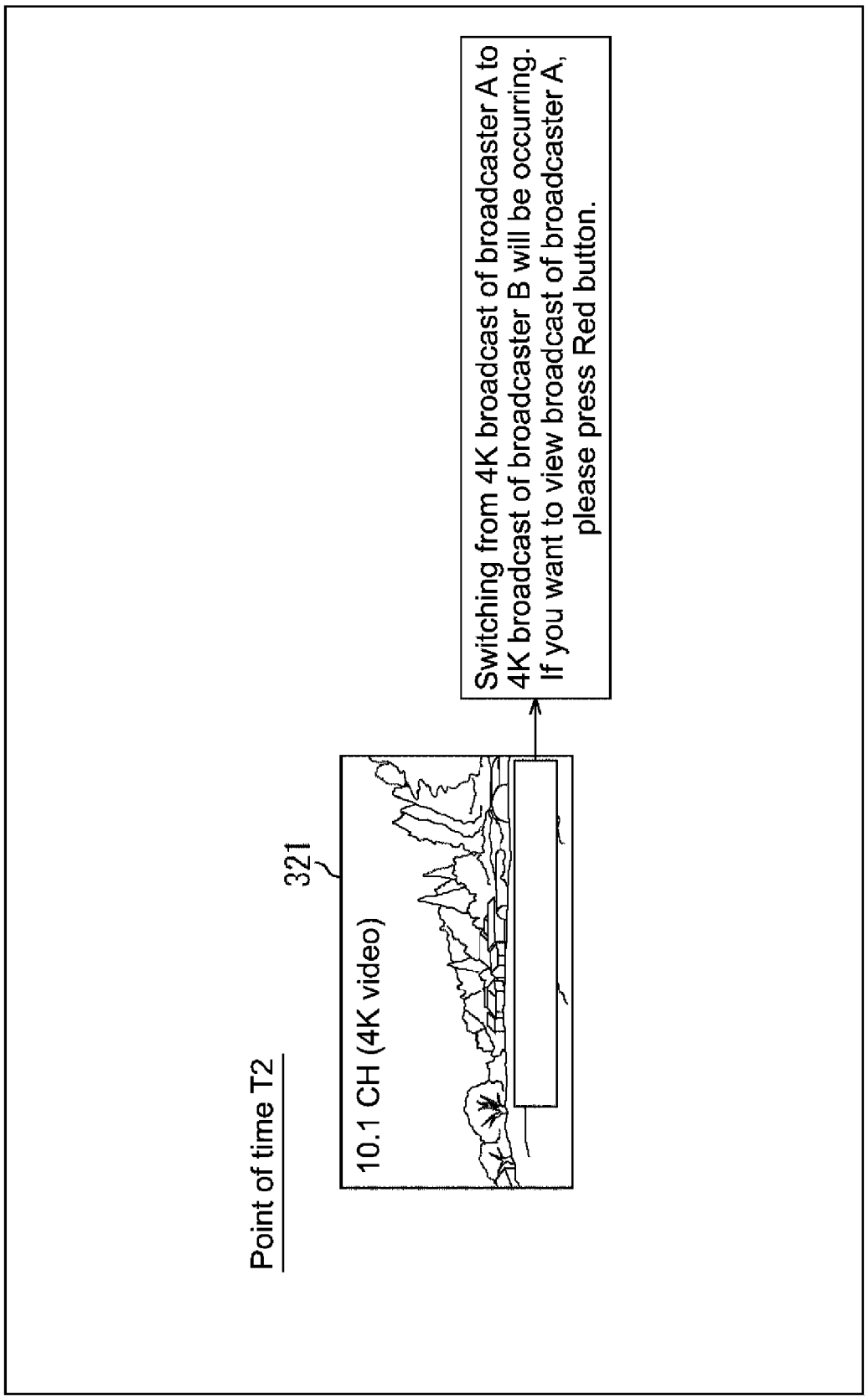
FIG. 13 is a diagram showing a first example of display of a message on the new-broadcast service preferred view mode.

Specifically, a message as shown in FIG. 13, for example, is displayed on the screen of the display unit 321 of the reception apparatus 30. That is, in FIG. 13, a message indicating that the new broadcast service is continued and the broadcaster that provides the 4K program is switched is displayed by the broadcast application in the predetermined region such as the lower right region of the video having the 4K image quality of the program A1.

At this time, the broadcast application identifies that the new-broadcast service preferred view mode has been set as the view mode, on the basis of the view mode information. A message of FIG. 13 is displayed on the premise that the 4K program provided by the new broadcast service is continuously viewed.

Note that, if the program provided by the same broadcaster A is to be continuously viewed, this message can include a message to press the Red button of the remote controller 31. Then, when the viewer who has checked this message operates the remote controller 31 and presses the Red button, the new broadcast service (10.1 CH) is not continued and switching to the existing broadcast service (25.1 CH of broadcaster A) is allowed.

Alternatively, the message displayed on the screen of the display unit 321 may be a default user interface or the like to switch between display and non-display in accordance with preferences of viewers.

In the determination processing (S22) of FIG. 12, if any operation is not performed by the viewer who has checked the message of FIG. 13, it is determined that the new broadcast service (10.1 CH) has to be continued, channel-selection processing of the existing broadcast service (25.1 CH) is not executed and the 4K programs (program A1 (4K) and program B2 (4K)) provided by the new broadcast service are allowed to be continuously viewed by the viewer. At this time, the reception apparatus 30 operates on the new-broadcast service preferred view mode in accordance with the contents set in advance.

Then, the program B2 (4K) is broadcast in 10.1 CH between the point of time t2 to the point of time t3. Therefore, in the reception apparatus 30, the stream of the new broadcast service is received and processed, and thus the program B2 (4K) is continuously reproduced and the program B2 (4K) is viewed by the viewer.

Note that, between the point of time t2 to the point of time t3, in the reception apparatus 30, the broadcast application is processed in the background and continuously executed, for example, such that the broadcast application is held in a standby state until a time just before the point of time t3.

After that, at the point of time t3, the program B2 (4K) of 10.1 CH ends. Meanwhile, in the reception apparatus 30, the determination processing (S23) of continuous viewing is performed.

Here, the broadcast application restoring from the standby state just before the point of time t3 presents information indicating that continuation of the new broadcast service (10.1 CH) and switching of the broadcaster that provides the 4K program will be occurring at a point of time before the point of time t3, on the basis of restart time information of the program A3 (4K) included in the simulcast information, for example. In this manner, it is possible to notify the viewer about switching of the broadcaster that provides the 4K program.

Figure 14:
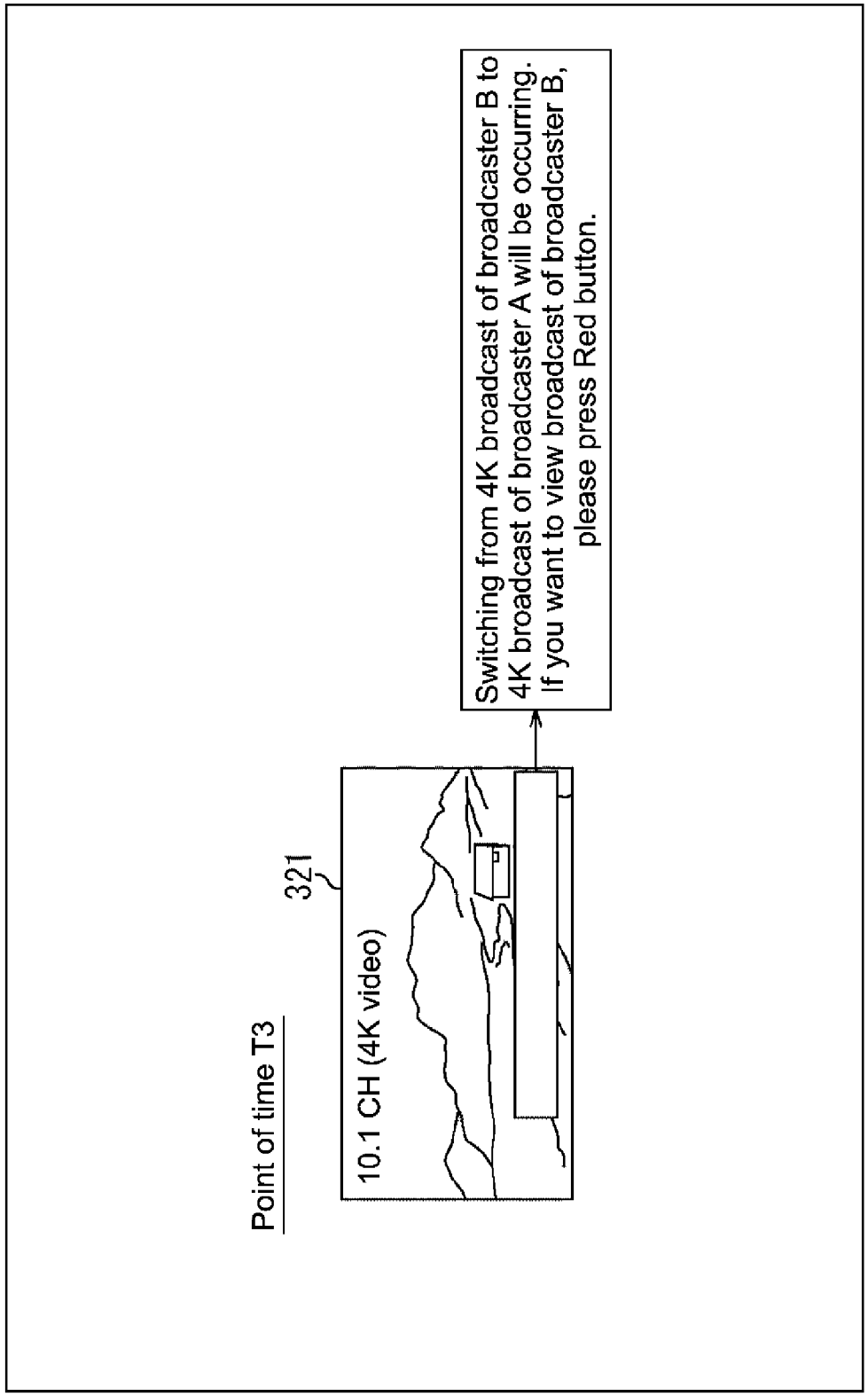
FIG. 14 is a diagram showing a second example of display of a message on the new-broadcast service preferred view mode.

Specifically, a message as shown in FIG. 14, for example, is displayed on the screen of the display unit 321 of the reception apparatus 30. That is, in FIG. 14, a message indicating that the new broadcast service is continued and the broadcaster that provides the 4K program is switched is displayed in the predetermined region of the video having the 4K image quality of the program B2.

At this time, in the reception apparatus 30, the new-broadcast service preferred view mode has been set as the view mode. Therefore, on the premise that the 4K program provided by the new broadcast service is continuously viewed, the message of FIG. 14 is displayed.

Note that, as in the message of FIG. 13, if the program provided by the same broadcaster B is to be continuously viewed, this message can include a message to press the Red button of the remote controller 31. Then, when the viewer who has checked this message operates the remote controller 31 and presses the Red button, the new broadcast service (10.1 CH) is not continued and switching to the existing broadcast service (25.2 CH of broadcaster B) is allowed.

In the determination processing (S23) of FIG. 12, if any operation is not performed by the viewer who has checked the message of FIG. 14, it is determined that the new broadcast service (10.1 CH) has to be continued, channel-selection processing of the existing broadcast service (25.2 CH) is not executed and the 4K programs (program A15 (4K), program B2 (4K), and program A3 (4K)) provided by the new broadcast service are allowed to be continuously viewed by the viewer. At this time, the reception apparatus 30 operates on the new-broadcast service preferred view mode in accordance with the contents set in advance.

Then, between the point of time t3 to the point of time t4, the program A3 (4K) is broadcast in 10.1 CH. Therefore, in the reception apparatus 30, the stream of the new broadcast service is received and processed, and thus the program A3 (4K) is continuously reproduced and the program A3 (4K) is viewed by the viewer.

Processing after the point of time t4 is similar to that described above, and hence a description thereof will be omitted. However, in 10.1 CH, during reproduction of the program A3 (4K), the simulcast information and the view mode information are acquired, and processing or the like based on the end time information of the program A3 (4K) is performed.

Note that, when the viewer who has checked the message of FIG. 13 or 14 presses the Red button of the remote controller 31, it is determined in the determination processing (S22 or S23) of FIG. 12 that the new broadcast service (10.1 CH) is not continued and it is necessary to perform channel switching to the existing broadcast service (25.1 CH of broadcaster A or 25.2 CH of broadcaster B).

In this case, the channel-selection processing is performed, and reproduction of the program A2 (2K) of the existing broadcast service (25.1 CH of broadcaster A) or the program B3 (2K) of the existing broadcast service (25.2 CH of broadcaster B) is started at the point of time t2 or the point of time t3. At this time, the reception apparatus 30 operates on the same-broadcaster continuous view mode.

Although the messages of FIGS. 13 and 14 are displayed by the broadcast application in the above description, those messages may be displayed by the receiver application.

Although the case where the two broadcasters of the broadcaster A and the broadcaster B commonly use the one physical channel of the new broadcast service has been described above as the example, three or more broadcasters may commonly use the one physical channel of the new broadcast service.

4. TRANSMISSION SCHEME OF SIMULCAST INFORMATION

Next, the transmission scheme of the simulcast information will be described. Here, three schemes of an MPD-EventStream scheme, an In-band message scheme, and a SimulcastEventDescriptor scheme will be each described as the transmission scheme of the simulcast information.

(1) MPD-EventStream Scheme

First of all, the MPD-EventStream scheme utilizing an EventStream element of media presentation description (MPD) will be described. Note that the MPD is control information of a video or music file to be used for streaming according to MPEG-dynamic adaptive streaming over HTTP (DASH).

FIG. 15 is a diagram showing an example of the EventStream element of the MPD.

The EventStream element is an upper-level element than a schemeIdUri attribute and an Event element.

The schemeIdUri attribute is specified as a uniform resource identifier (URI) for notification about the simulcast. For example, "urn:atsc3:us:simulcastNotification" is specified as this URI.

The Event element is an upper-level element than a simulcastChannel element, a simulcastEndTime element, and a simulcasatNextStartTime element.

In the simulcastChannel element, the channel number of the simulcast program is specified as the channel information. For example, "25.1" is specified as this channel number. Further, the simulcast program is, for example, a 2K program.

In the simulcastEndTime element, the end time of the simulcast base program is specified as program end time information. For example, "2017-04-01T11:59:59" is specified as this end time. Further, the simulcast base program is, for example, a 4K program.

In the simulcasatNextStartTime element, the restart time of the simulcast base program is specified as program restart time information. For example, "2017-04-01T13:00:00" is specified as this restart time. Further, the simulcast base program is, for example, a 4K program.

As described above, in the MPD-EventStream scheme, the simulcast information including the channel information, the program end time information, and the program restart time information is included by the EventStream element of the MPD.

Note that the MPD can be included in the upper-layer signaling. Further, detailed contents of the EventStream element of the MPD have been disclosed in Non-Patent Literature 3 below.

Non-Patent Literature 3: ISO/IEC23009-1 Information technology—Dynamic adaptive streaming over HTTP (DASH)—Part 1

(2) In-Band Message Scheme

Next, the In-band message scheme utilizing an Event Message Box defined by the MPEG-DASH will be described. Note that detailed contents of the Event Message Box have been disclosed in Non-Patent Literature 3 above.

FIG. 16 is a diagram showing an example of an Event Message Box defined by the MPEG DASH.

DASHEventMessageBox includes string-type scheme_id_uri, value, unsigned int (32)-type timescale, presentation_time_delta, event_duration, id, and unsigned int (8)-type message_data[ ].

FIG. 17 shows a description example of DASHEventMessageBox of FIG. 16.

In box_type, 'emsg' is specified.

In scheme_id_uri, "urn:atsc3:us:simulcastNotification" is specified as the URI for notification about the simulcast.

In value, "0" is specified. In timescale, "1000" is specified. In presentation_time_delta, "0" is specified. In event_duration, "0xFFFF" is specified. In id, "1" is specified.

In message_data[ ], "25.1" is specified as simulcastChannel, "2017-04-01T11:59:59" is specified as simulcastEndTime, and "2017-04-01T13:00:00" is specified as simulcastNextStartTime.

That is, in simulcastChannel, the channel number of the simulcast program, which is "25.1", is specified as the channel information. Further, in simulcastEndTime, the end time of the simulcast base program, which is "2017-04-01T11:59:59", is specified as the program end time information. Further, in simulcastNextStartTime, the restart time of the simulcast base program, which is "2017-04-01T13:00:00", is specified as the program restart time information.

As described above, in the In-band message scheme, the simulcast information including the channel information, the program end time information, and the program restart time information is included by message_data[ ] of DASHEventMessageBox.

(3) SimulcastEventDescriptor scheme

FIG. 18 is a diagram showing an example of SimulcastEventDescriptor.

SimulcastEventDescriptor includes simulcastChannel, simulcastEndTime, and simulcasatNextStartTime.

In simulcastChannel, the channel number of the simulcast program is specified as the channel information. For example, "25.1" is specified as this channel number. Further, the simulcast program is, for example, a 2K program.

In simulcastEndTime, the end time of the simulcast base program is specified as the program end time information. For example, "2017-04-01T11:59:59" is specified as this end time. Further, the simulcast base program is, for example, a 4K program.

In simulcasatNextStartTime, the restart time of the simulcast base program is specified as the program restart time information. For example, "2017-04-01T13:00:00" is specified as this restart time. Further, the simulcast base program is, for example, a 4K program.

As described above, in the SimulcastEventDescriptor scheme, the simulcast information including the channel information, the program end time information, and the program restart time information is included by SimulcastEventDescriptor included in the signaling such as the upper-layer signaling.

Note that the MPD-EventStream scheme, the In-band message scheme, and the SimulcastEventDescriptor scheme are examples of the transmission scheme of the simulcast information, and the simulcast information may be transmitted by other schemes.

5. COMMUNICATION OF APPLICATION (Example of Communication of Application)

Figure 19:
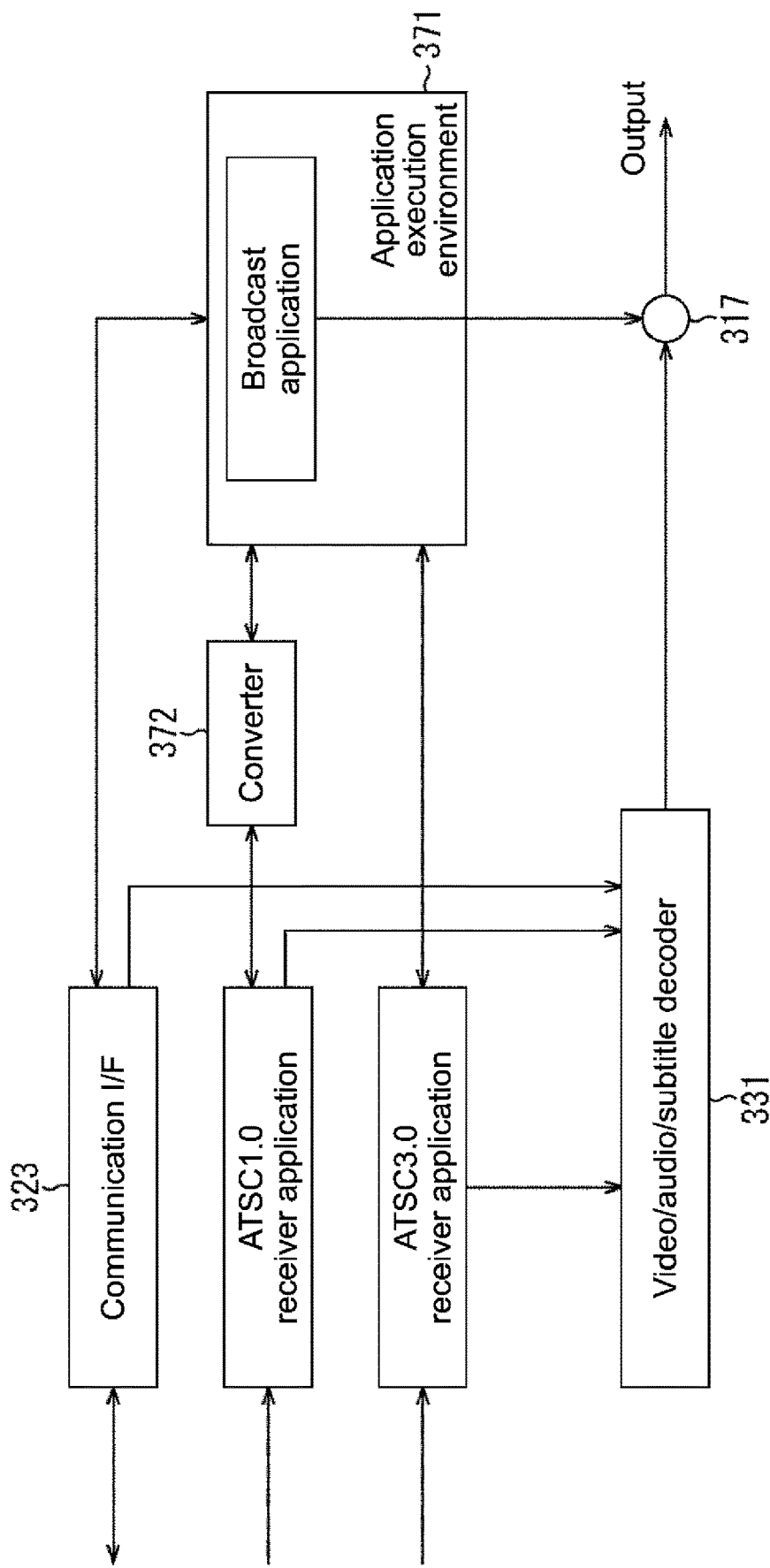
FIG. 19 is a diagram showing an example of communication between a broadcast application and receiver applications.

FIG. 19 is a diagram showing an example of communication between the broadcast application and the receiver applications.

FIG. 19 shows a configuration of a part of the reception apparatus 30 of FIG. 4. In the figure, an application execution environment 371 and a converter 372, which are provided as functions of the processor 311, are newly provided.

The application execution environment 371 is an environment for executing the broadcast application such as a browser adapted to the HTML5, for example. The broadcast application is acquired from broadcasting signals from the transmission apparatus 20 and activated.

The receiver application is a resident application and the ATSC1.0 receiver application corresponding to the existing broadcast service and the ATSC3.0 receiver application corresponding to the new broadcast service are activated.

The ATSC1.0 receiver application processes the received stream of the existing broadcast service (ATSC1.0), and supplies to the processed stream to the video/audio/subtitle decoder 331. The video/audio/subtitle decoder 331 decodes the data of video, audio, and subtitle obtained from the stream from the ATSC1.0 receiver application, and supplies the video data of the thus obtained data to the video output unit 317.

The video output unit 317 displays, on the display unit 321, the 2K video of the existing broadcast service (ATSC1.0) obtained from the video data from the video/audio/subtitle decoder 331. Further, display information from the broadcast application is supplied to the video output unit 317 in addition to the video data from the video/audio/subtitle decoder 331. The video output unit 317 superimposes the display information such as the message on the 2K video of the existing broadcast service (ATSC1.0) obtained from the video data, and displays them on the display unit 321.

The ATSC3.0 receiver application processes the received stream of the new broadcast service (ATSC3.0), and supplies the processed stream to the video/audio/subtitle decoder 331. The video/audio/subtitle decoder 331 decodes the data of video, audio, and subtitle obtained from the stream from the ATSC3.0 receiver application, and supplies to the video data of the thus obtained data to the video output unit 317.

The video output unit 317 displays, on the display unit 321, the 4K video of the new broadcast service (ATSC3.0) obtained from the video data from the video/audio/subtitle decoder 331. Further, the display information from the broadcast application is supplied to the video output unit 317 in addition to the video data from the video/audio/subtitle decoder 331. The video output unit 317 superimposes the display information such as the message on the 4K video of the new broadcast service (ATSC3.0) obtained from the video data, and displays them on the display unit 321.

Note that the streams of the broadcast application and the broadcast service may be acquired by the communication I/F 323 from the communication server 80 via the Internet 90 as streams of a communication application and a communication service, and supplied to the application execution environment 371 and the video/audio/subtitle decoder 331.

Here, a websocket is used for communication between the broadcast application and the receiver application. Note that the websocket is a standard of communication between a web server and a browser, which is established by world wide web consortium (W3C) and internet engineering task force (IETF).

In FIG. 19, the broadcast application is capable of directly communicating with the ATSC3.0 receiver application on the basis of a difference in implementation between the ATSC1.0 receiver application and the ATSC3.0 receiver application while the broadcast application is incapable of directly communicating with the ATSC1.0 receiver application.

In view of this, an interface between the broadcast application and the ATSC1.0 receiver application can use the converter 372 in order to minimize influence of the implementation corresponding to the existing broadcast service (ATSC1.0). Examples of this converter 372 can include a function to perform command communication with the broadcast application by, for example, a websocket server and convert the command from the broadcast application into a command adapted to the implementation corresponding to the existing broadcast service (ATSC1.0).

If it is necessary to acquire the view mode information, the simulcast information, and the like, the broadcast application transmits a query (request) to the receiver application, such that the view mode information, the simulcast information, and the like can be obtained as a response to that query. Here, detailed contents of the query and the response will be described with reference to FIGS. 20 and 21.

(Example of Query)

FIG. 20 is a diagram showing an example of a query transmitted from the broadcast application to the receiver application.

In FIG. 20, the query is described in a JavaScript (registered trademark) Object Notation (JSON) format that is a kind of text format. An object in the JSON format is expressed in such a manner that a key and a value are paired with a colon (:), zero or more such pair is arranged with a comma (,), and all of them are enclosed with curly brackets ({ }).

As shown in FIG. 20, with respect to a key that is "jsonrpc", a value indicating a version thereof, which is "2.0", is set in the query. The receiver application refers to this value and determines whether or not to process it as a query according to JSON-RPC 2.0. Note that the JSON-RPC is a protocol for remote procedure call (RPC) in the JSON format.

Further, with respect to a key that is "method", a value that is "org.atsc.query.simulcastService" indicating a method thereof is set in the query. The receiver application refers to this value and identifies that the type of the query is information about the simulcast service.

Further, with respect to a key that is "id", "45" is set in the query. This id is identification information for response to the query. If the id receives the query of "45", the receiver application sets the same id, "45", with respect to a response thereof.

(Example of Response)

FIG. 21 is a diagram showing an example of a response transmitted from the receiver application to the broadcast application. In FIG. 21, the response is described in the JSON format.

As shown in FIG. 21, in the response, with respect to a key that is "jsonrpc", a value indicating a version thereof, which is "2.0", is set. The broadcast application refers to this value and determines whether or not to process it as a response according to JSON-RPC 2.0.

The result is defined by JSON-RPC.

In the result, a return value of a method is set. In the case of the response shown in FIG. 21, the object in the JSON format is set. In the result, values are set with respect to "preferredsimulcastMode", "currentChannel", "simulcastChannel", "simulcastEndTime", and "simulcastNextStartTime".

With respect to a key that is "preferredsimulcastMode", a value that is "sameBroadcaster" indicating a view mode thereof is set. The broadcast application refers to this value and identifies the same-broadcaster continuous view mode as the view mode.

With respect to a key that is "currentChannel", a value that is "10.1" indicating a channel number of the currently selected program is set. The broadcast application refers to this value and identifies 10.1 CH as the channel number of the currently selected program.

With respect to a key that is "simulcastChannel", a value that is "25.1" indicating the channel number of the simulcast program is set. The broadcast application refers to this value and identifies 25.1 CH as the channel number of the simulcast program.

With respect to a key that is "simulcastEndTime", a value that is "2017-04-01T11:59:59" indicating a program end time thereof is set. The broadcast application refers to this value and identifies "2017-04-01T11:59:59" as the end time of the simulcast base program.

With respect to a key that is "simulcastNextStartTime", a value that is "2017-04-01T13:00:00" indicating a program restart time thereof is set. The broadcast application refers to this value and identifies "2017-04-01T13:00:00" as the restart time of the simulcast base program.

Further, in the response, with respect to a key that is "id", "45" is set. This id is identification information for response to the query. That is, the same ids, "45", are set in the query and the response.

(Example of Syntax)

FIG. 22 is a diagram showing an example of syntax of a result of the response of FIG. 21.

In preferredsimulcastMode, the view mode is specified. As this view mode, "SameBroadcaster" is specified for the same-broadcaster continuous view mode and "SameChannel" is specified for the new-broadcast service preferred view mode.

In currentChannel, a channel number of the currently selected program is specified.

In simulcastChannel, a channel number for simulcast of a currently viewed program (channel selection of program of existing broadcast service) is specified as the channel information.

In simulcastEndTime, an end time of the currently viewed program by the broadcaster of the new broadcast service is specified as the program end time information.

In simulcastNextStartTime, a point of time at which the currently viewed program of the new broadcast service by the broadcaster of the new broadcast service restarts is specified as the program restart time information.

Although the JSON format is employed as an example of the format of the query and the response in the above description, another format as an extensible markup language (XML) format or the like may be used. Further, the format of the query and the response is not limited to the text format, and may be a binary format.

Further, the broadcast application executes an application programming interface (API) provided by the reception apparatus 30 or the like, such that the view mode information and the simulcast information can be acquired from the receiver application.

6. FLOW OF PROCESSING ON TRANSMISSION SIDE AND RECEPTION SIDE (Transmission Processing)

Figure 23:
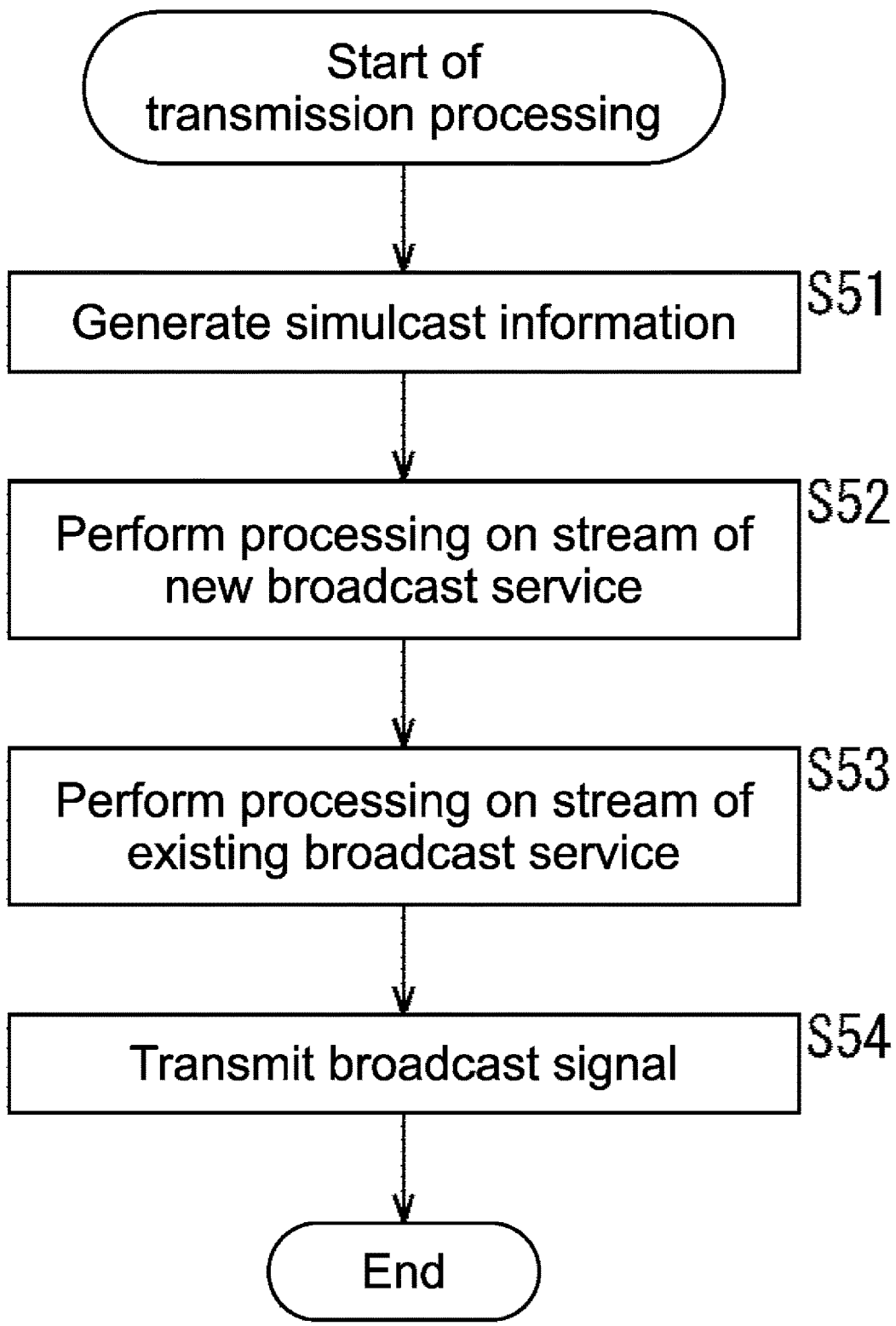
FIG. 23 is a flowchart describing a flow of transmission processing.

First of all, a flow of transmission processing to be executed by the data processing WO 2018/211989 PCT/JP2018/017494 apparatus 10 and the transmission apparatus 20 on the transmission side will be described with reference to the flowchart of FIG. 23.

In Step S51, the simulcast information generator 151 generates simulcast information. This simulcast information includes time information and channel information.

In Step S52, the multiplexer 152 processes a stream of a new broadcast service, which is input therein.

In Step S53, the multiplexer 152 processes a stream of an existing broadcast service, which is input therein.

In the processing of Step S52 or the processing of Step S53, the simulcast information generated in the processing of Step S51 is included in the stream of the new broadcast service or the stream of the existing broadcast service.

Here, if the MPD-EventStream scheme is employed, the simulcast information is processed to be included in the EventStream element of the MPD. If the In-band message scheme is employed, the simulcast information is processed to be included in message_data of DASHEventMessageBox defined by MPEG DASH. If the SimulcastEventDescriptor scheme is employed, the simulcast information is processed to be included in SimulcastEventDescriptor transmitted as the signaling.

In Step S54, the transmitter 153 processes the stream from the multiplexer 152, and transmits the thus obtained broadcasting signals.

Hereinabove, a flow of transmission processing has been described.

(View Mode Setting Processing)

Next, a flow of view mode setting processing to be executed by the reception apparatus 30 on the reception side will be described with reference to the flowchart of FIG. 24.

In Step S111, the view mode setting unit 351 displays the view mode setting screen on the display unit 321.

This view mode setting screen is a screen for allowing a viewer to set a view mode. A user interface for selecting the same-broadcaster continuous view mode or the new-broadcast service preferred view mode is presented on the screen.

In Step S112, the view mode setting unit 351 sets a view mode in accordance with a viewer's instruction on the view mode setting screen displayed in the processing of Step S111.

In Step S113, the view mode setting unit 351 records and saves information about the view mode set in the processing of Step S112, on the memory 312.

Here, if the viewer operates the remote controller 31 or the like to select the same-broadcaster continuous view mode from the view mode setting screen, the same-broadcaster continuous view mode is set and saved as the view mode. On the other hand, if the viewer selects the new-broadcast service preferred view mode from the view mode setting screen, the new-broadcast service preferred view mode is set and saved as the view mode.

Note that, regarding the view mode, other than setting according to the viewer's instruction, one of the same-broadcaster continuous view mode or the new-broadcast service preferred view mode may be set as a default value by using normal setting, for example.

Hereinabove, a flow of view mode setting processing has been described.

(Processing in TV Viewing)

Next, a flow of processing in TV viewing to be executed by the reception apparatus 30 on the reception side will be described with reference to the flowchart of FIG. 25.

It is assumed that, in executing this processing in TV viewing, the reception apparatus 30 such as the TV set is in a power-off state.

In Step S121, the processor 311 determines whether or not a power-on operation has been performed by the viewer.

If it is, in Step S121, determined that the power-on operation has not been performed by the viewer, the determination processing of Step S121 is repeated.

On the other hand, if it is, in Step S121, determined that the power-on operation has been performed by the viewer operating the remote controller 31 or the like, the reception apparatus 30 is powered on, and the processing proceeds to Step S122.

In Step S122, the processor 311 receives a channel selection operation when the viewer operates the remote controller 31 or the like and selects a desired channel.

In Step S123, the processor 311 executes channel selection and reproduction processing in accordance with the channel selection operation in the processing of Step S122.

Figure 24:
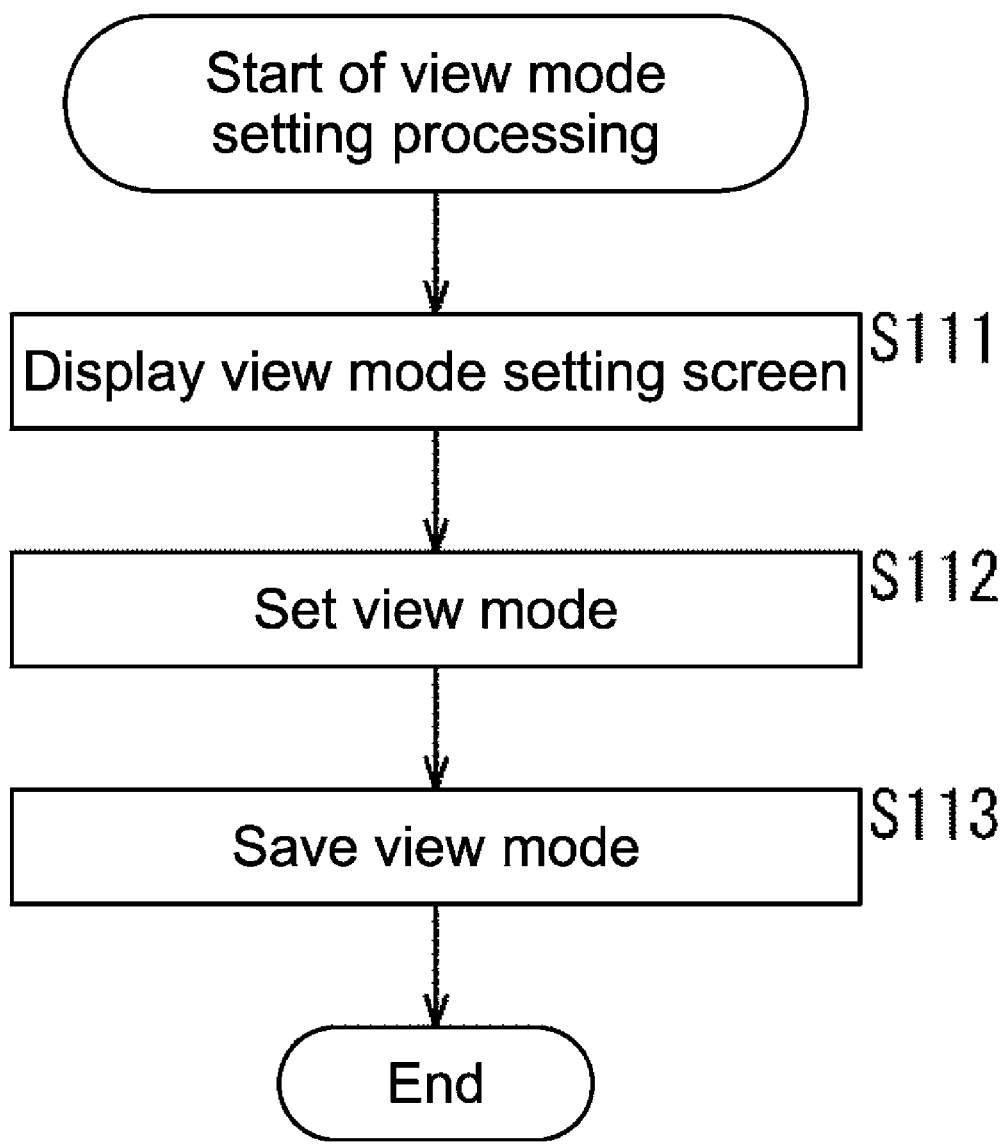
FIG. 24 is a flowchart describing a flow of view mode setting processing.

In this channel selection and reproduction processing, the program is reproduced on the same-broadcaster continuous view mode or the new-broadcast service preferred view mode set in the view mode setting processing (FIG. 24). Note that the channel selection and reproduction processing will be described later in detail with reference to the flowchart of FIG. 26.

In Step S124, the processor 311 determines whether or not a desired-channel selection operation has been performed by the viewer operating the remote controller 31 or the like.

If it is, in Step S124, determined that the channel selection operation has been performed by the viewer, the processing returns to Step S122, and the processing of Steps S122 and S123 is repeated. That is, the channel selection operation in the processing of Step S124 is received (S122), and channel selection and reproduction processing is executed in accordance with this channel selection operation (S123).

If it is, in Step S124, determined that the channel selection operation has not been performed by the viewer, the processing proceeds to Step S125. In Step S125, the processor 311 determines whether or not a power-off operation has been performed by the viewer.

If it is, in Step S125, determined that the power-off operation has not been performed by the viewer, the processing returns to Step S124, and the above-mentioned processing is executed.

Figure 25:
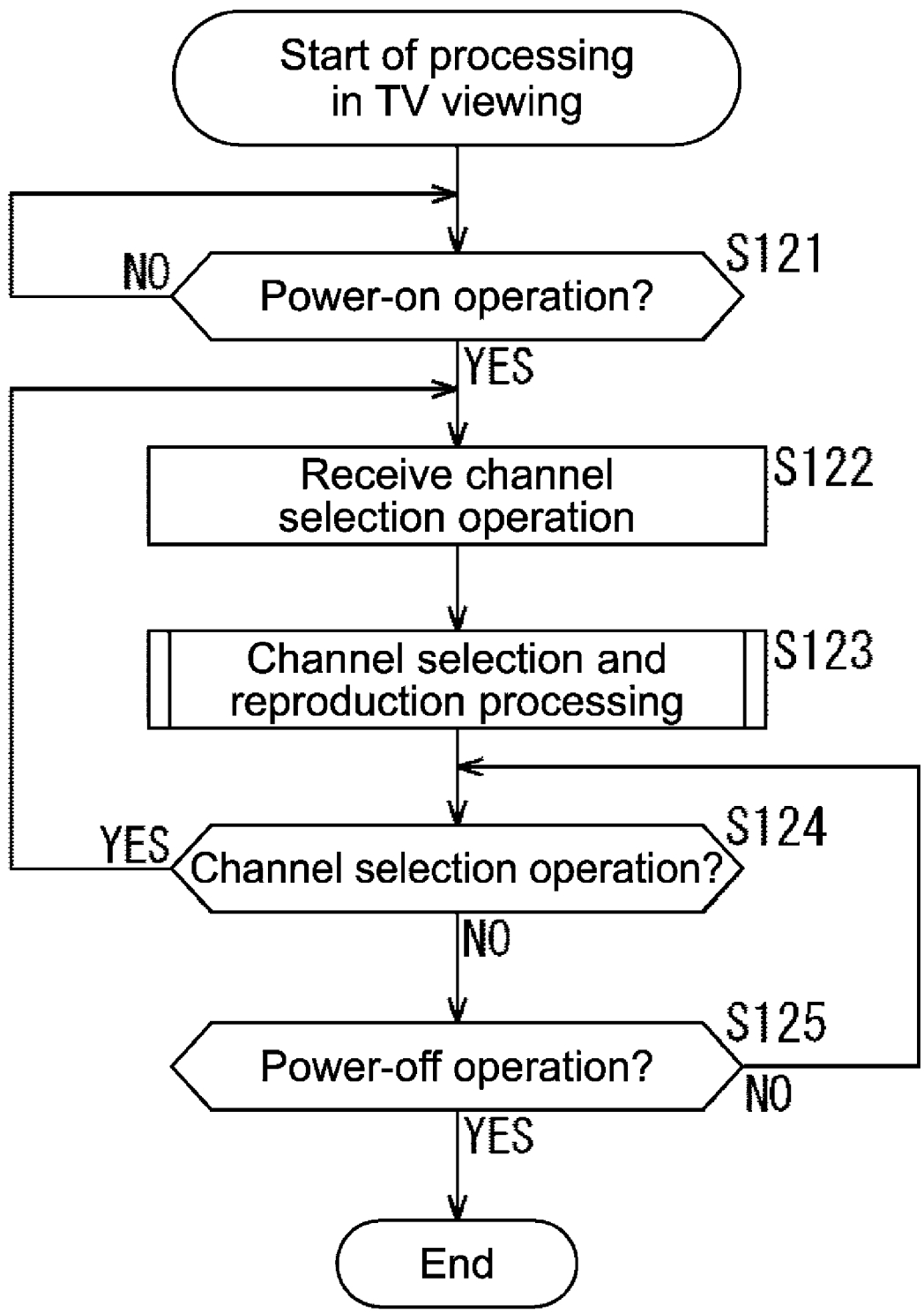
FIG. 25 is a flowchart describing a flow of processing in TV viewing.

On the other hand, if it is, in Step S125, determined that the power-off operation has been performed by the viewer operating the remote controller 31 or the like, the reception apparatus 30 is powered off, and the processing in TV viewing of FIG. 25 is terminated.

Hereinabove, a flow of processing in TV viewing has been described.

(Channel Selection and Reproduction Processing)

Next, a detailed flow of the channel selection and reproduction processing adaptive to the processing of Step S123 of FIG. 25 will be described with reference to the flowchart of FIG. 26.

In Step S131, the ATSC3.0 receiver application controls operations of the respective units to start reception and reproduction of the stream of the channel according to the channel-selection operation received in the processing of Step S122 of FIG. 25. Here, it is assumed that the 4K program of the channel-selection operation of the new broadcast service has been received in the processing of Step S122 of FIG. 25.

In Step S132, the application execution environment 371 controls operations of the respective units to receive and activate a broadcast application.

In Step S133, the receiver application determines whether or not the simulcast information has been acquired from the received stream.

Here, if the MPD-EventStream scheme is employed, the simulcast information is included in the EventStream element of the MPD. If the In-band message scheme is employed, the simulcast information is included in message_data of DASHEventMessageBox which is defined by MPEG DASH. If the SimulcastEventDescriptor scheme is employed, the simulcast information is included in SimulcastEventDescriptor transmitted as the signaling.

If it is, in Step S133, determined that the simulcast information has not been acquired, the determination processing of Step S133 is repeated.

On the other hand, if it is, in Step S133, determined that the simulcast information has been acquired, the processing proceeds to Step S134. Here, the receiver application acquires the simulcast information obtained from the received stream.

In Step S134, the receiver application saves the simulcast information acquired in the processing of Step S133.

In Step S135, the broadcast application issues a query for acquiring the simulcast information to the receiver application. In this query, "org.atsc.query.simulcastService" is specified as a method as shown in FIG. 20, for example.

In Step S136, the broadcast application acquires the simulcast information included in the response from the receiver application and saves the acquired simulcast information, in accordance with the query issued in the processing of Step S135. This response includes the view mode information and the simulcast information as shown in FIG. 21, for example.

In Step S137, the broadcast application determines whether or not it is timing to display a message indicating that it is a simulcast switching time, on the basis of the program end time information included in the simulcast information.

Here, for example, if the timing to display a message indicating that it is a simulcast switching time is five seconds before the end time (simulcast switching time) of the simulcast base program, dT=5 (seconds) is set. Then, in the determination processing of Step S137, when the current time becomes the simulcast switching time−5 (seconds), "YES" is determined, and the processing proceeds to Step S138.

In Step S138, the broadcast application checks the view mode set in the view mode setting processing (FIG. 24), on the basis of the view mode information included in the response obtained in the processing of Step S135.

If it is, in Step S138, determined that the same-broadcaster continuous view mode has been set as the view mode, the processing proceeds to Step S139.

In Step S139, the broadcast application, the ATSC1.0 receiver application, and the ATSC3.0 receiver application control operations of the respective units to execute the same-broadcaster continuous view mode adaptive processing. Note that the same-broadcaster continuous view mode adaptive processing will be described later in detail with reference to the flowchart of FIG. 27.

If it is, in Step S138, determined that the new-broadcast service preferred view mode has been set as the view mode, the processing proceeds to Step S140.

In Step S140, the broadcast application and the ATSC3.0 receiver application control operations of the respective units to execute the new-broadcast service preferred view mode adaptive processing. Note that the new-broadcast service preferred view mode adaptive processing will be described later in detail with reference to the flowchart of FIG. 28.

When the processing of Step S139 or the processing of Step S140 ends, the processing returns to Step S123 of FIG. 25, and the subsequent processing is executed.

Hereinabove, the detailed flow of the channel selection and reproduction processing has been described.

(Same Broadcaster Continuous View Mode Adaptive Processing)

Next, a detailed flow of the same-broadcaster continuous view mode adaptive processing adaptive to the processing of Step S139 of FIG. 26 will be described with reference to the flowchart of FIG. 27.

It is assumed that, in executing this same-broadcaster continuous view mode adaptive processing, the 4K program of the new broadcast service by the broadcaster A is reproduced in the reception apparatus 30 such as the TV set and viewed by the viewer.

In Step S151, the broadcast application displays, on the screen of the display unit 321, a notice indicating that switching from the 4K program of the new broadcast service to the 2K program of the existing broadcast service in the same broadcaster A will be occurring. For example, the message shown in A of FIG. 10 is displayed on the screen of the display unit 321, superimposed on the 4K video of the new broadcast service.

In Step S152, the broadcast application determines whether or not it is the end time (simulcast switching time) of the simulcast base program, on the basis of the program end time information included in the simulcast information.

If it is, in Step S152, determined that it is not the simulcast switching time, the processing returns to Step S151, and the above-mentioned processing is repeated. In this case, the superimposed display of the message shown in A of FIG. 10 is continued.

On the other hand, if it is, in Step S152, determined that it is the simulcast switching time, the processing proceeds to Step S153.

In Step S153, on the basis of the channel information included in the simulcast information, the broadcast application controls operations of the respective units to switch the channel from the 4K program of the new broadcast service to the 2K program of the existing broadcast service in the same broadcaster A.

In Step S154, the broadcast application displays, on the screen of the display unit 321, a notice of completion of switching to the 2K program of the existing broadcast service. For example, the message shown in B of FIG. 10 is displayed on the screen of the display unit 321, superimposed on the 2K video of the existing broadcast service.

In Step S155, the ATSC1.0 receiver application controls operations of the respective units to process the stream of the existing broadcast service and reproduce the 2K program of the existing broadcast service.

In Step S156, the broadcast application determines whether or not it is timing to display a message indicating that it is a simulcast switching time, on the basis of the program restart time information included in the simulcast information.

Here, for example, if the timing to display a message indicating that it is a simulcast switching time is five seconds before the restart time of the simulcast base program (simulcast switching time), dT=5 (seconds) is set. Then, in the determination processing of Step S156, when the current time becomes the simulcast switching time−5 (seconds), "YES" is determined, and the processing proceeds to Step S157.

In Step S157, the broadcast application displays, on the screen of the display unit 321, a notice that switching from the 2K program of the existing broadcast service to the 4K program of the new broadcast service in the same broadcaster A will be occurring. For example, the message shown in A of FIG. 11 is displayed on the screen of the display unit 321, superimposed on the 2K program of the existing broadcast service.

In Step S158, on the basis of the program restart time information included in the simulcast information, the broadcast application determines whether or not it is the restart time (simulcast switching time) of the simulcast base program.

If it is, in Step S158, determined that it is not the simulcast switching time, the processing returns to Step S157, and the above-mentioned processing is repeated. In this case, the superimposed display of the message shown in A of FIG. 11 is continued.

On the other hand, if it is, in Step S158, determined that it is the simulcast switching time, the processing proceeds to Step S159.

In Step S159, on the basis of the already acquired channel information of the new broadcast service, the broadcast application controls operations of the respective units to switch the channel from the 2K program of the existing broadcast service to the 4K program of the new broadcast service in the same broadcaster A.

In Step S160, the broadcast application displays a notice of completion of switching to the 4K program of the new broadcast service, on the screen of the display unit 321. For example, the message shown in B of FIG. 11 is displayed on the screen of the display unit 321, superimposed on the 4K video of the new broadcast service.

In Step S161, the ATSC3.0 receiver application controls operations of the respective units to process the stream of the new broadcast service and reproduce the 4K program of the new broadcast service.

Figure 26:
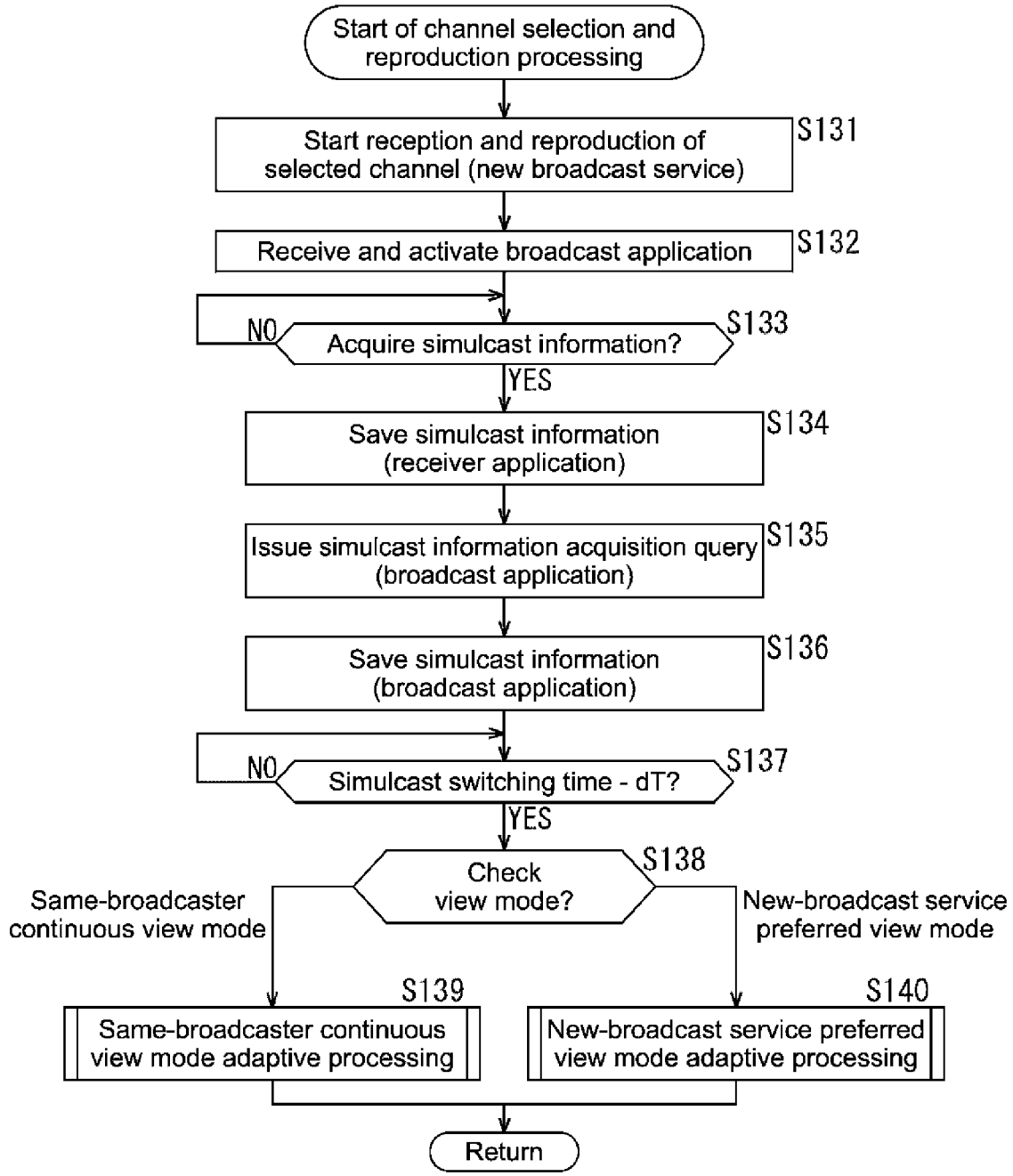
FIG. 26 is a flowchart describing a detailed flow of channel selection and reproduction processing.
Figure 27:
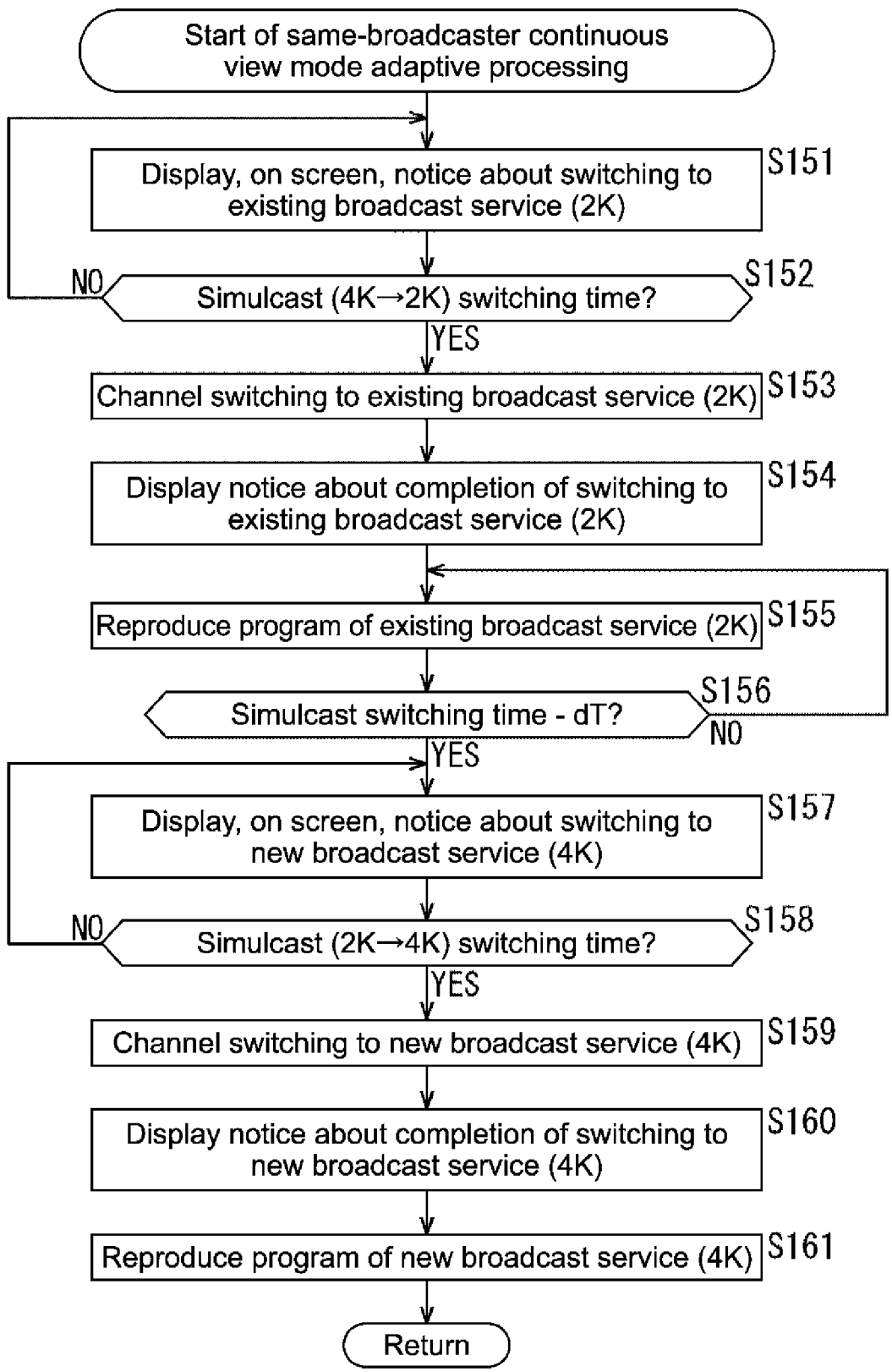
FIG. 27 is a flowchart describing a detailed flow of same-broadcaster continuous view mode adaptive processing.

When the processing of Step S161 ends, the processing returns to the processing of Step S139 of FIG. 26, and the subsequent processing is executed.

Hereinabove, the detailed flow of the same-broadcaster continuous view mode adaptive processing has been described.

(New-Broadcast Service Preferred View Mode Adaptive Processing)

Figure 28:
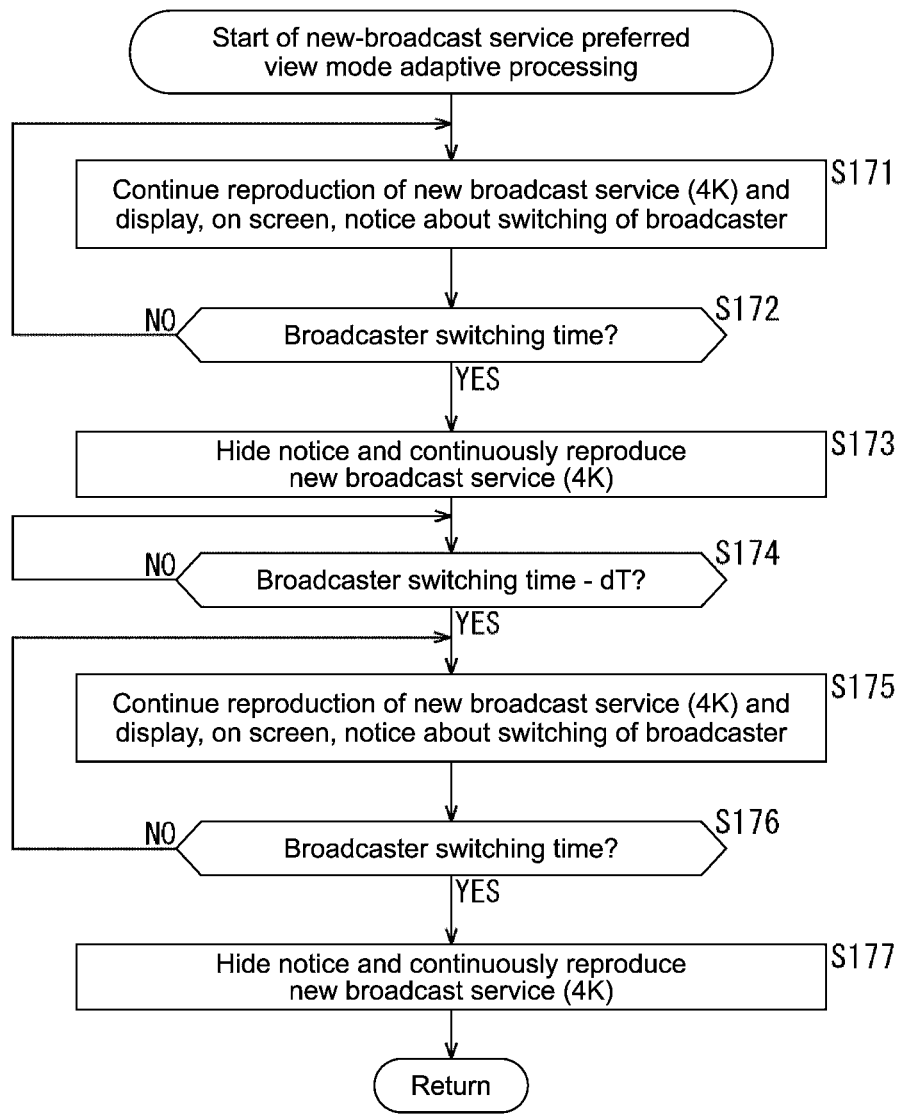
FIG. 28 is a flowchart describing a detailed flow of new-broadcast service preferred view mode adaptive processing.

Last of all, a detailed flow of the new-broadcast service preferred view mode adaptive processing adaptive to the processing of Step S140 of FIG. 26 will be described with reference to the flowchart of FIG. 28.

It is assumed that, in executing this new-broadcast service preferred view mode adaptive processing, the 4K program of the new broadcast service by the broadcaster A is reproduced in the reception apparatus 30 such as the TV set and viewed by the viewer.

In Step S171, the ATSC3.0 receiver application controls operations of the respective units to process the stream of the new broadcast service and continuously reproduce the 4K program of the new broadcast service by the broadcaster A.

Further, the broadcast application displays, on the screen of the display unit 321, a notice that switching from the 4K program of the broadcaster A to the 4K program of the broadcaster B in the same new broadcast service will be occurring. For example, the message shown in FIG. 13 is displayed on the screen of the display unit 321, superimposed on the 4K program of the broadcaster A.

In Step S172, on the basis of the program end time information included in the simulcast information, the broadcast application determines whether or not it is the end time (broadcaster switching time) of the 4K program of the broadcaster A.

If it is, in Step S172, determined that it is not the broadcaster switching time, the processing returns to Step S171, and the above-mentioned processing is repeated. In this case, the superimposed display of the message shown in FIG. 13 is continued.

If it is, in Step S172, determined that it is the broadcaster switching time, the processing proceeds to Step S173.

In Step S173, the broadcast application hides the notice on the screen of the display unit 321. Further, the ATSC3.0 receiver application controls operations of the respective units to process the stream of the new broadcast service and continuously reproduce the 4K program of the new broadcast service by the broadcaster B.

In Step S174, on the basis of the program restart time information included in the simulcast information, the broadcast application determines whether or not it is timing to display a message indicating that it is a broadcaster switching time.

Here, for example, if the timing to display a message indicating that it is the broadcaster switching time is five seconds before the restart time (broadcaster switching time) of the program of the broadcaster A, dT=5 (seconds) set. Then, in the determination processing of Step S174, when the current time becomes the broadcaster switching time−5 (seconds), "YES" is determined, and the processing proceeds to Step S175.

In Step S175, the ATSC3.0 receiver application controls operations of the respective units to process the stream of the new broadcast service and continuously reproduce the 4K program of the new broadcast service by the broadcaster B.

Further, the broadcast application displays, on the screen of the display unit 321, a notice that switching from the 4K program of the broadcaster B to the 4K program of the broadcaster A in the same new broadcast service will be occurring. For example, the message shown in FIG. 14 is displayed on the screen of the display unit 321, superimposed on the 4K program of the broadcaster B.

In Step S176, on the basis of the program restart time information included in the simulcast information, the broadcast application determines whether or not it is the restart time (broadcaster switching time) of the program of the broadcaster A.

If it is, in Step S176, determined that it is not the broadcaster switching time, the processing returns to Step S175, and the above-mentioned processing is repeated. In this case, the superimposed display of the message shown in FIG. 14 is continued.

On the other hand, if it is, in Step S176, determined that it is the broadcaster switching time, the processing proceeds to Step S177.

In Step S177, the broadcast application hides the notice on the screen of the display unit 321. Further, the ATSC3.0 receiver application controls operations of the respective units to process the stream of the new broadcast service and continuously reproduce the 4K program of the new broadcast service by the broadcaster A.

When the processing of Step S177 ends, the processing returns to Step S140 of FIG. 26, and the subsequent processing is executed.

Hereinabove, the detailed flow of the new-broadcast service preferred view mode adaptive processing has been described.

As described above, in simulcast operation in which the plurality of broadcasters commonly use the one physical channel to operate the new broadcast service and the plurality of broadcasters respectively provide existing broadcast services in the physical channel different from the commonly-used physical channel, the following can be, for example, realized in accordance with the present technology.

That is, on the basis of viewer's setting of the view mode, the reception apparatus 30 is capable of selecting prioritizing continuous viewing of the new broadcast service or prioritizing the broadcaster and performing switching from the new broadcast service to the existing broadcast service or returning from the existing broadcast service to the new broadcast service.

Further, on the basis of signaling of the simulcast operation and viewer's setting, the reception apparatus 30 is capable of notifying the viewer and performing switching processing/return processing at suitable timing.

On the broadcaster side, it is possible to maintain the operation of the existing broadcast service, which is requested by the organization that performs regulatory oversight of broadcasting communication projects (e.g., Federal Communications Commission (FCC) in United States), while performing the operation of the new broadcast service in parallel. Here, the new broadcast service can be one not having backward compatibility with the existing broadcast service.

7. MODIFIED EXAMPLES

Other Broadcast Scheme Examples

In the above description, the ATSC (in particular, ATSC1.0 and ATSC3.0) that is a scheme employed in the United States and the like has been shown as the broadcast scheme of the digital TV broadcasting. However, the present technology may be applied to a scheme such as integrated services digital broadcasting (ISDB) that is a scheme employed in Japan and the like and digital video broadcasting (DVB) that is a scheme employed in the European countries and the like.

That is, for example, the present technology can be applied to simulcast operation in a case where the ISDB or DVB is established as the scheme of next-generation digital TV broadcasting and operation thereof is started.

Although the ATSC3.0 employing an IP transmission scheme is shown as the example in the above description, another scheme, for example, MPEG2-Transport Stream (TS) scheme may be employed, not limited to the IP transmission scheme.

Further, the scheme of satellite broadcasting utilizing broadcasting satellite (BS), communication satellite (CS), or the like and the scheme of wire-broadcasting such as cable TV (CATV) may be employed as the broadcast scheme of the digital TV broadcasting, other than the terrestrial broadcasting.

Application Examples

The broadcast application is not limited to an application developed in markup language such as the HTML5 or in script language such as the JavaScript (registered trademark), and may be an application developed in programming language, for example, Java (registered trademark). Further, the broadcast application is not limited to the one displayed, and may be one not displayed but executed in the background.

The broadcast application executed by the reception apparatus 30 is not limited to the application executed by the browser, and may be executed as a so-called native application in an operating system (OS) environment (presentation control environment) or the like. In addition, the application executed by the reception apparatus 30 is not limited to the broadcast application acquired via broadcasting, and may be a communication application acquired from the communication server 80 over the Internet 90 via communication.

Further, the content reproduced by the reception apparatus 30 is not limited to the broadcast content delivered via broadcasting, and may be communication content delivered via communication. This communication content includes, for example, content to be delivered by video on demand (VOD) streaming and downloadable content. Note that the broadcast content and the communication content can include, in addition to TV programs (e.g., news, sports, and drama), movies, and the like, any content such as moving images, music, electronic books, games, and advertisement.

(Others)

The names used in the present specification are exemplary and may be replaced by other names in practice. It should be noted that those name differences are only differences in form, and the replaced names do not refer to substantially different contents. For example, simulcastChannel (channel information), simulcastEndTime (program end time information), and simulcastNextStartTime (program restart time information) may be replaced by other names.

Further, in the present specification, the "2K video" refers to a video adapted to a screen resolution of approximately 1920×1080 pixels, and the "4K video" refers to a video adapted to a screen resolution of approximately 4000×2000 pixels. Although the content of the 4K video is shown as the content having high image quality in the above description, the content may be content having higher image quality such as 8K video. It should be noted that the "8K video" refers to a video adapted to a screen resolution of approximately 7680×4320 pixels. In addition, the difference between the existing broadcast service and the new broadcast service is not limited to the difference in resolution. For example, a high-image quality service may be provided by increasing the luminance and widening the color gamut in accordance with a high dynamic range (HDR) technique, increasing the number of display pictures (frames) per second, etc.

Further, in the present specification, the "channel" may mean a logical channel number (logical channel) defined for operation and setting at the reception apparatus 30 or may mean a physical channel number (physical channel) allocated to a frequency band (range of frequency) used in broadcasting. In the present specification, the term "channel" is simply used if it is not particularly necessary to distinguish the logical channel from the physical channel. In a case of emphasizing that it is the physical channel number, the term "physical channel" is used instead of the term "channel".

8. CONFIGURATION OF COMPUTER

Figure 29:
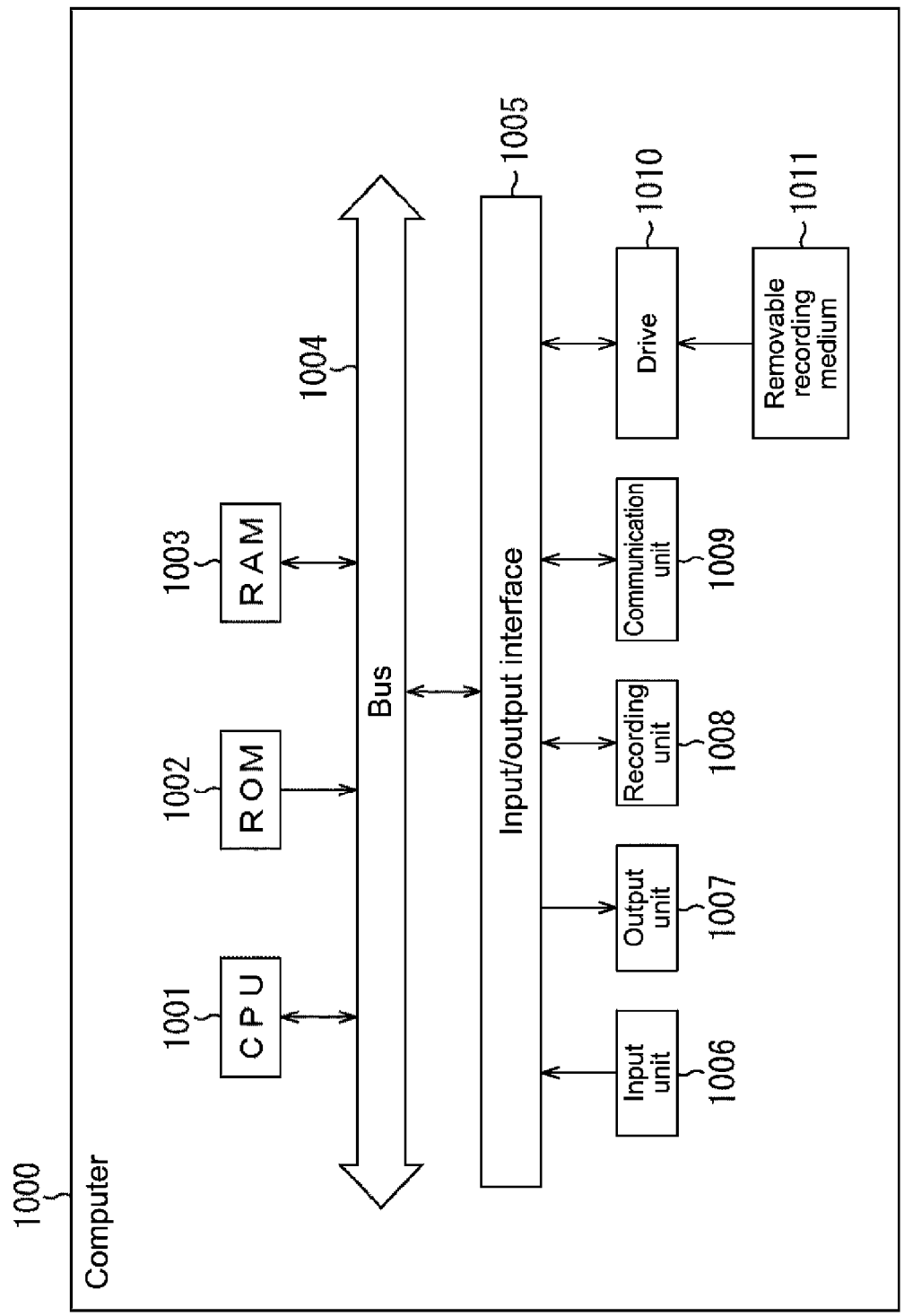
FIG. 29 is a diagram showing a configuration example of a computer.

The above-mentioned series of processing may be executed by hardware or may be executed by software. If the series of processing is executed by software, programs that configure that software are installed. FIG. 29 is a diagram showing a configuration example of hardware of a computer that executes the above-mentioned series of processing in accordance with programs.

In a computer 1000, a central processing unit (CPU) 1001, a read only memory (ROM) 1002, a random access memory (RAM) 1003 are connected to one another via a bus 1004. An input/output interface 1005 is further connected to the bus 1004. An input unit 1006, an output unit 1007, a recording unit 1008, a communication unit 1009, and a drive 1010 are connected to the input/output interface 1005.

The input unit 1006 includes a keyboard, a mouse, a microphone, and the like. The output unit 1007 includes a display, a speaker, and the like. The recording unit 1008 includes a hard disk, a nonvolatile memory, and the like. The communication unit 1009 includes a network interface and the like. The drive 1010 drives a removable recording medium 1011 such as a magnetic disk, an optical disc, a magneto-optical disk, and a semiconductor memory.

In the computer 1000 configured in the above-mentioned manner, the CPU 1001 loads programs recorded on the ROM 1002 and the recording unit 1008, into the RAM 1003 via the input/output interface 1005 and the bus 1004 and executes the loaded programs. In this manner, the above-mentioned series of processing is performed.

For example, the programs to be executed by the computer 1000 (CPU 1001) can be provided, recorded on the removable recording medium 1011 that is a package medium or the like. Further, the programs can be provided via a wired or wireless transmission medium such as a local area network, the Internet, and digital satellite broadcasting.

In the computer 1000, the programs can be installed in the recording unit 1008 via the input/output interface 1005 by mounting the removable recording medium 1011 on the drive 1010. Further, the programs can be installed in the recording unit 1008 by receiving the programs at the communication unit 1009 via the wired or wireless transmission medium. In addition, the programs can be installed on the ROM 1002 and the recording unit 1008 in advance.

Here, in the present specification, the processing to be performed by the computer in accordance with the programs does not necessarily need to be performed chronologically in the order described as the flowcharts. That is, the processing to be performed by the computer in accordance with the programs also includes processing to be executed in parallel or individually (e.g., parallel processing or object processing). Further, the programs may be processed by a single computer (processor) or may be processed by a plurality of computers in a decentralized manner.

Note that embodiments of the present technology are not limited to the above-mentioned embodiments but various changes can be made without departing from the gist of the present technology.

It should be noted that the present technology can also take the following configurations.

(1)

A reception apparatus, including receiver circuitry configured to receive a first stream that includes a first broadcast service, time information, and channel information, the first broadcast service provides a first program that is a simulcast of a second program provided by a second broadcast service, the second broadcast service being included in a second stream; and processing circuitry configured to decode for display one of the first broadcast service provided by the first stream or a second broadcast service provided by the second stream according to a time indicated by the time information included in the first stream.

(2)

The reception apparatus according to (1), in which the time information includes an end time of the first program provided by the first broadcast service, the channel information includes a channel number of the second broadcast service, and the processing circuitry is configured to decode for display one of a third program that is provided by the first broadcast service after the first program or a fourth program that is provided by the second broadcast service according to the time indicated by the time information included in the first stream.

(3)

The reception apparatus according to (1) or (2), in which the first broadcast service provides programs from a plurality of broadcasters in a first frequency band, and the second broadcast service provides programs from one of the plurality of broadcasters in a second frequency band.

(4)

The reception apparatus according to (3), in which the plurality of broadcasters includes a first broadcaster and a second broadcaster, the first program is from the first broadcaster, the second program is from the first broadcaster, and the third program is from the second broadcaster.

(5)

The reception apparatus according to any of (2) to (4), in which the time information further includes a start time of a fifth program provided by the first broadcast service, the fifth program is from the first broadcaster and provided by the first broadcast service after the third program, and the processing circuitry is configured to decode the fifth program according to the start time of the fifth program which is indicated by the time information, after the processing circuitry decodes for display the fourth program according to the end time of the first program which is indicated by the time information.

(6)

The reception apparatus according to (5), in which the processing circuitry is configured to output for display a message indicating that program switching is to be performed, immediately before or immediately after the end time of the first program or immediately before or immediately after the start time of the fifth program.

(7)

The reception apparatus according to any of (3) to (6), in which the processing circuitry is configured to set one of a plurality of modes in accordance with a user selection, the plurality of modes including a first mode in which the third program is decoded for display after the first program and the programs provided by the first broadcast service from the plurality of broadcasters are decoded for display, and a second mode in which switching from decoding for display of the first program to decoding for display of the fourth program is performed and the programs provided by the second broadcast service from the one of the plurality of broadcasters are continuously decoded for display.

(8)

The reception apparatus according to any of (1) to (7), in which the first broadcast service is provided according to a first broadcast standard, and the second broadcast service is provided according to a second broadcast standard that is different from the first broadcast standard.

(9)

The reception apparatus according to any of (1) to (8), in which the time information and the channel information are included in simulcast information, the simulcast information being provided by utilizing an EventStream element of a media presentation description (MPD), provided by utilizing an Event Message Box defined by MPEG dynamic adaptive streaming over HTTP (DASH), or provided by a descriptor describing the simulcast information.

(10)

A reception method of a reception apparatus, the method including receiving a first stream that includes a first broadcast service, time information, and channel information, the first broadcast service provides a first program that is a simulcast of a second program provided by a second broadcast service, the second broadcast service being included in a second stream; and decoding for display, by processing circuitry of the reception apparatus, one of the first broadcast service provided by the first stream or the second broadcast service provided by the second stream according to a time indicated by the time information included in the first stream.

(11)

The reception method according to (10), in which the time information includes an end time of the first program provided by the first broadcast service, the channel information includes a channel number of the second broadcast service, and the method further includes decoding for display one of a third program that is provided by the first broadcast service after the first program or a fourth program that is provided by the second broadcast service according to the time indicated by the time information included in the first stream.

(12)

The reception method according to (10) or (11), in which the first broadcast service provides programs from a plurality of broadcasters in a first frequency band, and the second broadcast service provides programs from one of the plurality of broadcasters in a second frequency band.

(13)

The reception method according to (12), in which the plurality of broadcasters includes a first broadcaster and a second broadcaster, the first program is from the first broadcaster, the second program is from the first broadcaster, and the third program is from the second broadcaster.

(14)

The reception method according to any of (11) to (13), in which the time information further includes a start time of a fifth program provided by the first broadcast service, the fifth program is from the first broadcaster and provided by the first broadcast service after the third program, and the method further includes decoding the fifth program according to the start time of the fifth program which is indicated by the time information, after the fourth program is decoded for display according to the end time of the first program which is indicated by the time information.

(15)

The reception method according to (14), further including outputting for display a message indicating that program switching is to be performed, immediately before or immediately after the end time of the first program or immediately before or immediately after the start time of the fifth program.

(16)

The reception method according to any of (12) to (15), further including setting one of a plurality of modes in accordance with a user selection, the plurality of modes including a first mode in which the third program is decoded for display after the first program and the programs provided by the first broadcast service from the plurality of broadcasters are decoded for display, and a second mode in which switching from decoding for display of the first program to decoding for display of the fourth program is performed and the programs provided by the second broadcast service from the one of the plurality of broadcasters are continuously decoded for display.

(17)

The reception method according to any of (10) to (16), in which the first broadcast service is provided according to a first broadcast standard, and the second broadcast service is provided according to a second broadcast standard that is different from the first broadcast standard.

(18)

The reception method according to any of (10) to (17), in which the time information and the channel information are included in simulcast information, the simulcast information being provided by utilizing an EventStream element of a media presentation description (MPD), provided by utilizing an Event Message Box defined by MPEG dynamic adaptive streaming over HTTP (DASH), or provided by a descriptor describing the simulcast information.

(19)

A transmission apparatus, including processing circuitry configured to generate simulcast information; and transmission circuitry configured to transmit the simulcast information in a first stream that includes a first broadcast service, the first broadcast service provides a first program that is a simulcast of a second program provided by a second broadcast service, the second broadcast service being included in a second stream, in which the simulcast information includes time information including an end time of the first program provided by the first broadcast service, and channel information including a channel number of the second program provided by the second broadcast service.

(20)

The transmission apparatus according to (19), in which the first broadcast service provides programs from a plurality of broadcasters in a first frequency band, and the second broadcast service provides programs from one of the plurality of broadcasters in a second frequency band.

(21)

The transmission apparatus according to (20), in which the plurality of broadcasters includes a first broadcaster and a second broadcaster, the first program is from the first broadcaster, and the second program is from the first broadcaster.

(22)

The transmission apparatus according to (21), in which a third program from the second broadcaster is provided by the first broadcast service after the first program.

(23)

The transmission apparatus according to (22), in which a fourth program from the first broadcaster is provided by the first broadcast service after the third program, and the time information further includes a start time of the fourth program.

(24)

The transmission apparatus according to any of (19) to (23), in which the first broadcast service is provided according to a first broadcast standard, and the second broadcast service is provided according to a second broadcast standard that is different from the first broadcast standard.

(25)

The transmission apparatus according to any of (19) to (24), in which the simulcast information is provided by utilizing an EventStream element of a media presentation description (MPD), provided by utilizing an Event Message Box defined by MPEG dynamic adaptive streaming over HTTP (DASH), or provided by a descriptor describing the simulcast information.

(26)

A transmission method of a transmission apparatus, the method including generating, by processing circuitry of the transmission apparatus, simulcast information; and transmitting the simulcast information in a first stream that includes a first broadcast service, the first broadcast service provides a first program that is a simulcast of a second program provided by a second broadcast service, the second broadcast service being included in a second stream, in which the simulcast information includes time information including an end time of the first program provided by the first broadcast service, and channel information including a channel number of the second program provided by the second broadcast service.

(27)

The transmission method according to (26), in which the first broadcast service provides programs from a plurality of broadcasters in a first frequency band, and the second broadcast service provides programs from one of the plurality of broadcasters in a second frequency band.

(28)

The transmission method according to (27), in which the plurality of broadcasters includes a first broadcaster and a second broadcaster, the first program is from the first broadcaster, and the second program is from the first broadcaster.

(29)

The transmission method according to (28), in which a third program from the second broadcaster is provided by the first broadcast service after the first program.

(30)

The transmission method according to (29), in which a fourth program from the first broadcaster is provided by the first broadcast service after the third program, and the time information further includes a start time of the fourth program.

(31)

The transmission method according to any of (26) to (30), in which the first broadcast service is provided according to a first broadcast standard, and the second broadcast service is provided according to a second broadcast standard that is different from the first broadcast standard.

(32)

The transmission method according to any of (26) to (31), in which the simulcast information is provided by utilizing an EventStream element of a media presentation description (MPD), provided by utilizing an Event Message Box defined by MPEG dynamic adaptive streaming over HTTP (DASH), or provided by a descriptor describing the simulcast information.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Broadcasting system
10, 10-1 to 10-N Data processing apparatus
11, 11-1 to 11-N Data processing apparatus
20 Transmission apparatus
30, 30-1 to 30-M Reception apparatus
31 Remote controller
40, 40-1 to 40-N Communication line
41, 41-1 to 41-N Communication line
50 Broadcasting transmission path
80 Communication server
90 Internet
111 Component processor
112 Signaling generator
113 Multiplexer
114 Data processor
151 Simulcast information generator
152 Multiplexer
153 Transmitter
211 Data processor
212 Modulator
311 Processor
312 Memory
313 Input unit
313A Optical receiver
314 Tuner
315 Demultiplexer
316 Video decoder
317 Video output unit
318 Audio decoder
319 Audio output unit
320 Subtitle decoder
321 Display unit
322 Speaker
323 Communication I/F
331 Video/audio/subtitle decoder
371 Application execution environment
372 Converter
351 View mode setting unit
352 Channel selection and reproduction processing unit
353 Message display controller
1000 Computer
1001 CPU

The invention claimed is:

1. A reception apparatus, comprising:
receiver circuitry configured to receive a first stream that includes a first broadcast service, time information, and channel information, the first broadcast service provides a first program that is a simulcast of a second program provided by a second broadcast service, the second broadcast service being included in a second stream; and
processing circuitry configured to
decode for display one of the first broadcast service provided by the first stream or the second broadcast service provided by the second stream according to a time indicated by the time information included in the first stream, and
automatically decode for display one of a third program provided by the first broadcast service after the first program or a fourth program provided by the second broadcast service according to a selected one of a first view mode indicating that a continuous broadcaster is preferred or a second view mode indicating that a next generation broadcaster is preferred.

2. The reception apparatus according to claim 1, wherein the time information includes an end time of the first program provided by the first broadcast service,
the channel information includes a channel number of the second broadcast service, and
the processing circuitry is configured to decode for display the one of the third program that is provided by the first broadcast service after the first program or the fourth program that is provided by the second broadcast service according to the time indicated by the time information included in the first stream.

3. The reception apparatus according to claim 2, wherein the first broadcast service provides programs from a plurality of broadcasters in a first frequency band, and
the second broadcast service provides programs from one of the plurality of broadcasters in a second frequency band.

4. The reception apparatus according to claim 3, wherein the plurality of broadcasters includes a first broadcaster and a second broadcaster,
the first program is from the first broadcaster,
the second program is from the first broadcaster, and
the third program is from the second broadcaster.

5. The reception apparatus according to claim 4, wherein the time information further includes a start time of a fifth program provided by the first broadcast service,
the fifth program is from the first broadcaster and provided by the first broadcast service after the third program, and
the processing circuitry is configured to decode the fifth program according to the start time of the fifth program which is indicated by the time information, after the processing circuitry decodes for display the fourth program according to the end time of the first program which is indicated by the time information.

6. The reception apparatus according to claim 5, wherein the processing circuitry is configured to output for display a message indicating that program switching is to be performed, immediately before or immediately after the end time of the first program or immediately before or immediately after the start time of the fifth program.

7. The reception apparatus according to claim 4, wherein the processing circuitry is configured to set one of the first view mode or the second view mode in accordance with a user selection, in the first view mode, programs provided by the first broadcast service from the plurality of broadcasters are decoded for display, and in the second view mode, programs provided by the second broadcast service from the one of the plurality of broadcasters are continuously decoded for display.

8. The reception apparatus according to claim 1, wherein the first broadcast service is provided according to a first broadcast standard, and the second broadcast service is provided according to a second broadcast standard that is different from the first broadcast standard.

9. The reception apparatus according to claim 1, wherein the time information and the channel information are included in simulcast information, the simulcast information being provided by utilizing an EventStream element of a media presentation description (MPD), provided by utilizing an Event Message Box defined by MPEG dynamic adaptive streaming over HTTP (DASH), or provided by a descriptor describing the simulcast information.

10. A reception method of a reception apparatus, the method comprising:

receiving a first stream that includes a first broadcast service, time information, and channel information, the first broadcast service provides a first program that is a simulcast of a second program provided by a second broadcast service, the second broadcast service being included in a second stream;

decoding for display, by processing circuitry of the reception apparatus, one of the first broadcast service provided by the first stream or the second broadcast service provided by the second stream according to a time indicated by the time information included in the first stream; and automatically decoding for display one of a third program provided by the first broadcast service after the first program or a fourth program provided by the second broadcast service according to a selected one of a first view mode indicating that a continuous broadcaster is preferred or a second view mode indicating that a next generation broadcaster is preferred.

11. A transmission apparatus, comprising:

processing circuitry configured to generate simulcast information; and transmission circuitry configured to transmit the simulcast information in a first stream that includes a first broadcast service, the first broadcast service provides a first program that is a simulcast of a second program provided by a second broadcast service, the second broadcast service being included in a second stream, wherein the simulcast information includes time information including an end time of the first program provided by the first broadcast service, and channel information including a channel number of the second program provided by the second broadcast service, and the first broadcast service provides programs from a plurality of broadcasters and the second broadcast service provides programs from only one of the plurality of broadcasters.

12. The transmission apparatus according to claim 11, wherein the first broadcast service provides the programs from the plurality of broadcasters in a first frequency band, and the second broadcast service provides the programs from the one of the plurality of broadcasters in a second frequency band.

13. The transmission apparatus according to claim 12, wherein the plurality of broadcasters include a first broadcaster and a second broadcaster, the first program is from the first broadcaster, and the second program is from the first broadcaster.

14. The transmission apparatus according to claim 13, wherein a third program from the second broadcaster is provided by the first broadcast service after the first program.

15. The transmission apparatus according to claim 14, wherein a fourth program from the first broadcaster is provided by the first broadcast service after the third program, and the time information further includes a start time of the fourth program.

16. The transmission apparatus according to claim 11, wherein the first broadcast service is provided according to a first broadcast standard, and the second broadcast service is provided according to a second broadcast standard that is different from the first broadcast standard.

17. The transmission apparatus according to claim 11, wherein the simulcast information is provided by utilizing an EventStream element of a media presentation description (MPD), provided by utilizing an Event Message Box defined by MPEG dynamic adaptive streaming over HTTP (DASH), or provided by a descriptor describing the simulcast information.

18. A transmission method of a transmission apparatus, the method comprising:

generating, by processing circuitry of the transmission apparatus, simulcast information; and transmitting the simulcast information in a first stream that includes a first broadcast service, the first broadcast service provides a first program that is a simulcast of a second program provided by a second broadcast service, the second broadcast service being included in a second stream, wherein the simulcast information includes time information including an end time of the first program provided by the first broadcast service, and channel information including a channel number of the second program provided by the second broadcast service, and the first broadcast service provides programs from a plurality of broadcasters and the second broadcast service provides programs from only one of the plurality of broadcasters.

* * * * *